(12) United States Patent
Kopietz

(10) Patent No.: US 10,469,867 B2
(45) Date of Patent: Nov. 5, 2019

(54) SYSTEMS AND METHODS FOR PLAYER INPUT MOTION COMPENSATION BY ANTICIPATING MOTION VECTORS AND/OR CACHING REPETITIVE MOTION VECTORS

(71) Applicant: ZeniMax Media Inc., Rockville, MD (US)

(72) Inventor: Michael Kopietz, Frankfurt (DE)

(73) Assignee: ZeniMax Media Inc., Rockville, MD (US)

( * ) Notice: Subject to any disclaimer, the term of this patent is extended or adjusted under 35 U.S.C. 154(b) by 0 days.

(21) Appl. No.: 15/958,979

(22) Filed: Apr. 20, 2018

(65) Prior Publication Data

US 2018/0311577 A1 Nov. 1, 2018

Related U.S. Application Data

(60) Provisional application No. 62/644,164, filed on Mar. 16, 2018, provisional application No. 62/640,945, (Continued)

(51) Int. Cl.
*H04N 7/12* (2006.01)
*H04N 19/513* (2014.01)
(Continued)

(52) U.S. Cl.
CPC ........... *H04N 19/521* (2014.11); *A63F 13/35* (2014.09); *A63F 13/358* (2014.09); *A63F 13/40* (2014.09);
(Continued)

(58) Field of Classification Search
CPC ... G06F 12/0844; G06T 7/2033; H04N 19/40; H04N 19/51; H04N 5/235; H04N 19/563
(Continued)

(56) References Cited

U.S. PATENT DOCUMENTS 6,903,662 B2 6/2005 Rix et al.
7,844,002 B2 11/2010 Lu et al.
(Continued)

FOREIGN PATENT DOCUMENTS

EP 1820281 B2 8/2017
JP H6121518 A 4/1994
(Continued)

OTHER PUBLICATIONS

Wang, Z. et al., "Image Quality Assessment: From Error Visibility to Structural Similarity," IEEE Transactions on Image Processing, 13(4), pp. 600-612, Apr. 2004.
(Continued)

*Primary Examiner* — Gims S Philippe
(74) *Attorney, Agent, or Firm* — Blank Rome LLP

(57) ABSTRACT

Systems and methods for reducing latency through motion estimation and compensation techniques are disclosed. The systems and methods include a client device that uses transmitted lookup tables from a remote server to match user input to motion vectors, and tag and sum those motion vectors. When a remote server transmits encoded video frames to the client, the client decodes those video frames and applies the summed motion vectors to the decoded frames to estimate motion in those frames. In certain embodiments, the systems and methods generate motion vectors at a server based on predetermined criteria and transmit the generated motion vectors and one or more invalidators to a client, which caches those motion vectors and invalidators. The server instructs the client to receive input from a user, and use that input to match to cached motion vectors or invalidators. Based on that comparison, the client then applies the matched motion vectors or invalidators to effect motion compensation in a graphic interface. In other embodiments, the systems and methods cache
(Continued)

repetitive motion vectors at a server, which transmits a previously generated motion vector library to a client. The client stores the motion vector library, and monitors for user input data. The server instructs the client to calculate a motion estimate from the input data and instructs the client to update the stored motion vector library based on the input data, so that the client applies the stored motion vector library to initiate motion in a graphic interface prior to receiving actual motion vector data from the server. In this manner, latency in video data streams is reduced.

21 Claims, 13 Drawing Sheets

Related U.S. Application Data filed on Mar. 9, 2018, provisional application No. 62/634,464, filed on Feb. 23, 2018, provisional application No. 62/488,526, filed on Apr. 21, 2017.

(51) Int. Cl.

| | |
|---|---|
| *H04N 19/139* | (2014.01) |
| *H04N 19/176* | (2014.01) |
| *H04N 19/517* | (2014.01) |
| *A63F 13/358* | (2014.01) |
| *H04N 19/162* | (2014.01) |
| *H04N 19/44* | (2014.01) |
| *H04N 19/107* | (2014.01) |
| *H04N 19/172* | (2014.01) |
| *A63F 13/35* | (2014.01) |
| *A63F 13/40* | (2014.01) |
| *A63F 13/52* | (2014.01) |
| *H04N 19/527* | (2014.01) |

(52) U.S. Cl.
CPC .......... *A63F 13/52* (2014.09); *H04N 19/107* (2014.11); *H04N 19/139* (2014.11); *H04N 19/162* (2014.11); *H04N 19/172* (2014.11); *H04N 19/176* (2014.11); *H04N 19/44* (2014.11); *H04N 19/517* (2014.11); *A63F 2300/534* (2013.01); *A63F 2300/538* (2013.01); *H04N 19/527* (2014.11)

(58) Field of Classification Search
USPC .......... 375/240.03, 240.15, 240.16; 348/352; 711/118
See application file for complete search history.

(56) References Cited

U.S. PATENT DOCUMENTS

| | | | |
|---|---|---|---|
| 8,069,258 B1 | 11/2011 | Howell | |
| 8,154,553 B2 | 4/2012 | Peterfreund | |
| 8,678,929 B1 | 3/2014 | Nishimura et al. | |
| 8,787,460 B1 | 7/2014 | Hobbs | |
| 8,854,376 B1 | 10/2014 | Bhat et al. | |
| 8,873,636 B2 | 10/2014 | Iwasaki | |
| 9,358,466 B2 | 6/2016 | Kruglick | |
| 9,609,330 B2 | 3/2017 | Puri et al. | |
| 9,661,351 B2 | 5/2017 | Laan | |
| 9,665,334 B2 | 5/2017 | Iwasaki | |
| 9,697,280 B2 | 7/2017 | Maharajh et al. | |
| 9,705,526 B1 | 7/2017 | Veernapu | |
| 9,736,454 B2 | 8/2017 | Hannuksela et al. | |
| 9,749,642 B2 | 8/2017 | Sullivan et al. | |
| 9,762,911 B2 | 9/2017 | Puri et al. | |
| 9,762,919 B2 | 9/2017 | Cote et al. | |
| 9,774,848 B2 | 9/2017 | Jayant et al. | |
| 9,875,552 B1* | 1/2018 | Savage ................. G06T 7/2033 |
| 9,912,992 B2 | 3/2018 | Spracklen et al. | |
| 2004/0027329 A1 | 2/2004 | Nakamura | |
| 2005/0195975 A1 | 9/2005 | Kawakita | |
| 2006/0230428 A1 | 10/2006 | Craig et al. | |
| 2009/0010337 A1* | 1/2009 | Wang ................... H04N 19/563 375/240.16 |
| 2009/0080523 A1* | 3/2009 | McDowell ............ H04N 19/51 375/240.15 |
| 2010/0026880 A1* | 2/2010 | Ito .......................... H04N 5/235 348/352 |
| 2010/0099491 A1 | 4/2010 | Little et al. | |
| 2011/0026598 A1 | 2/2011 | Takada | |
| 2011/0261885 A1 | 10/2011 | de Rivaz | |
| 2011/0294566 A1 | 12/2011 | Cardno et al. | |
| 2012/0233405 A1* | 9/2012 | Budagavi ............ G06F 12/0844 711/118 |
| 2013/0343450 A1* | 12/2013 | Solka ..................... H04N 19/40 375/240.03 |
| 2015/0088942 A1 | 3/2015 | Shah | |
| 2015/0119139 A1 | 4/2015 | Ladell et al. | |
| 2015/0143032 A1 | 5/2015 | Hashimoto | |
| 2015/0228106 A1 | 8/2015 | Laksono | |
| 2016/0198166 A1 | 7/2016 | Kudana et al. | |
| 2016/0227218 A1 | 8/2016 | Trudeau et al. | |
| 2017/0132830 A1 | 5/2017 | Ha et al. | |
| 2017/0155910 A1 | 6/2017 | Owen | |
| 2017/0200253 A1 | 7/2017 | Ling | |
| 2017/0232345 A1 | 8/2017 | Rofougaran et al. | |
| 2017/0278296 A1 | 9/2017 | Chui et al. | |
| 2018/0067605 A1 | 3/2018 | Lin et al. | |
| 2018/0089091 A1 | 3/2018 | Akenine-Moller et al. | |
| 2018/0115743 A1 | 4/2018 | McLoughlin et al. | |
| 2018/0133599 A1 | 5/2018 | Lang | |
| 2018/0139462 A1 | 5/2018 | Wang et al. | |

FOREIGN PATENT DOCUMENTS

| | | |
|---|---|---|
| JP | H6129865 A | 5/1994 |
| TW | 201640893 A | 11/2016 |
| WO | WO-2009138878 A2 | 11/2009 |
| WO | WO-2016172314 A1 | 10/2016 |
| WO | WO-2018010823 A1 | 1/2018 |

OTHER PUBLICATIONS

Moorthy, A.K., "Efficient Motion Weighted Spatio-Termporal Video SSIM Index," Human Vision and Electronic Imaging XV, vol. 7527, Mar. 2010,(http://live.ece.utexas.edu/publications/2010/moorthy_spie_jan10.pdf).

BGR Microsoft Article, http://bgr.com/2018/03/16/microsoft-netflix-for-games-subscription-cloud/.

Verge's Article on Blade Technology, https://www.theverge.com/2018/2/21/17029934/blade-shadow-us-launch-netflix-for-pc-games-cloud-streaming-windows-10.

Parsec TechCrunch Article, https://techcrunch.com/2017/12/19/is-the-time-finally-right-for-platform-agnostic-cloud-gaming/.

* cited by examiner

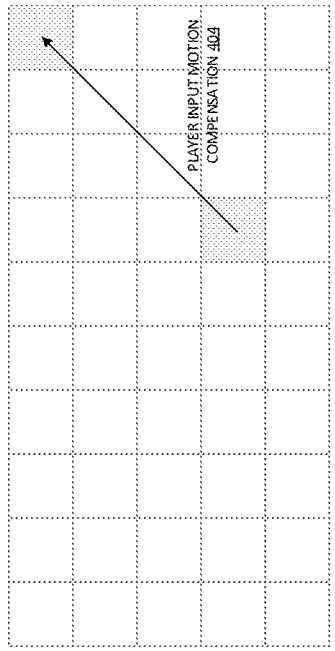
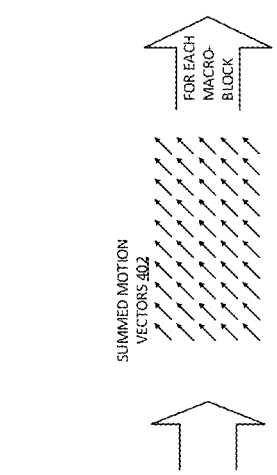
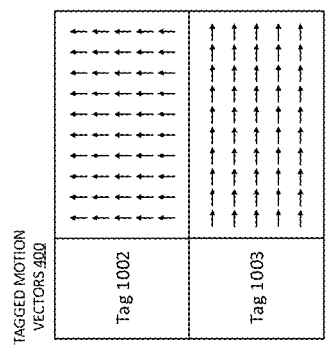
FIG. 4A
FIG. 4B
FIG. 4C

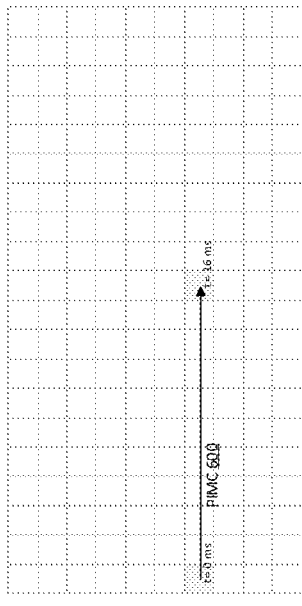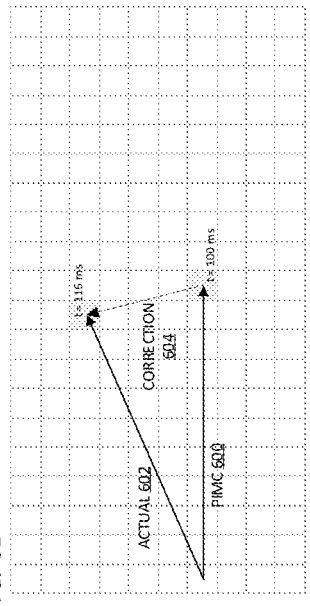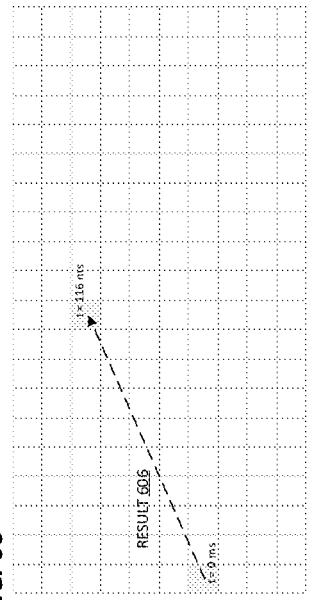
FIG. 6A
FIG. 6B
FIG. 6C

SYSTEMS AND METHODS FOR PLAYER INPUT MOTION COMPENSATION BY ANTICIPATING MOTION VECTORS AND/OR CACHING REPETITIVE MOTION VECTORS

RELATED APPLICATIONS

This application claims the benefit of the following U.S. Provisional Application No. 62/488,526, filed Apr. 21, 2017, No. 62/634,464, filed Feb. 23, 2018, No. 62/640,945, filed Mar. 9, 2018, and No. 62/644,164, filed Mar. 16, 2018.

BACKGROUND OF THE INVENTION

Remote gaming applications, in which a server-side game is controlled by a client-side player, have attempted to encode the video output from a three-dimensional (3D) graphics engine in real-time using existing or customized encoders. However, the interactive nature of video games, particularly the player feedback loop between video output and player input, makes game video streaming much more sensitive to latency than traditional video streaming. Existing video coding methods can trade computational power, and little else, for reductions in encoding time. New methods for integrating the encoding process into the video rendering process can provide significant reductions in encoding time while also reducing computational power, improving the quality of the encoded video, and retaining the original bitstream data format to preserve interoperability of existing hardware devices.

Unlike regular video playback, video games have a unique player input to video feedback loop. Players are very sensitive to latency between input and video output. High latency in this player input-feedback loop has been a significant stumbling block for video game streaming applications in which a server-hosted video game instance is controlled by a remote player. Any process that can reduce the time between input and feedback will directly improve user experience.

The client hardware in a game streaming environment may have varying levels of computational performance, but dedicated H.264 hardware decoders are becoming more ubiquitous, even in mobile and other low-power devices. A hardware decoder is good at performing a small selection of computations, such as motion compensation, which are regularly performed according to the H.264 coding standard. The strengths of the dedicated decoding hardware can be exploited to provide a better player experience in a game streaming environment regardless of the overall computational power of the client.

In local, non-streamed rendering applications, the game engine can add several frames of latency between player input and video feedback. In game streaming applications, additional latency is introduced to the player input-feedback cycle because player input must travel through the network to the remote server and video output must be encoded, transmitted, and decoded before the player receives feedback. For some player inputs, the client can estimate the results on video feedback by performing motion compensation immediately, cutting out the network latency.

Player input motion compensation is, at its most basic, a technique of shifting groups of pixels in order to sacrifice some image accuracy for a decrease in input-feedback latency in situations where a video game is running on a server while being controlled remotely by a networked client. This technique is good at reducing player-feedback latency for inputs that result in consistent motion vectors, such as player view rotations in first-person games.

In a video game, player-context is defined as the current game state which is the result of previous player actions, inputs, and decisions. The client in a game streaming system is naïve to the player-context, that is, the client receives only the video output and none of the game-state information that will determine the results of certain player inputs. There are a wide range of inputs that result in unique yet predictable motion outcomes based on game-state information. These inputs would benefit from a reduction in player-feedback latency but cannot be pre-cached on the client for traditional player input motion compensation because the client will not have player-context information. Additionally, the player-context permutation space may be too exhaustive to pre-generate motion vectors for methods such as cached repetitive motion vectors. These systems and methods are described in U.S. Provisional Application Nos. 62/488,526; 62/634,464; and 62/640,945; all three of which are incorporated here in their entireties. The game-server can compensate by generating anticipated motion vectors and updating the client's input motion compensation cache as the player-context changes. This allows the client to use player input motion compensation techniques for a limited set of context-dependent inputs, resulting in input-feedback latency reduction.

U.S. Pat. No. 9,661,351 ("the '351 patent"), discloses systems and methods for skipping a frame during transmission from a server to a client device, where, in response to detecting the skipped frame, the client device generating a predicted frame that replaces the skipped frame in the compressed video stream, the predicted frame being generated based on extending delta information from one or more previous frames decoded by the client device. For this technology, the client-side frame prediction of one or more reconstructed or predicted frames is used following a skipped frame based on the data (e.g., motion vectors, residuals, etc.) of one or more preceding frames. The technology also prioritizes bit allocation and/or subfeature encoding. Encoded Network Abstraction Layer Units (NALUs) could be split into (1) motion vectors and (2) residuals. Instead of actually skipping a frame, the apparatus may just send minimal encoding data as prioritized. For example it could send just motion vectors if motion is prioritized. The present invention is superior to the technology of the '351 patent at least because the '351 patent does not disclose a client device that uses transmitted lookup tables from a server to match user input to motion vectors and tags and sums those motion vectors. The '351 patent also does not disclose the application of those summed motion vectors to the decoded frames to estimate motion in those frames. The present invention is also superior because it reduces input-feedback latency, which is significantly reduced by using player input motion compensation instead of waiting for the server to return output video.

U.S. Pat. No. 8,678,929, ("the '929 patent), is directed to the operation of a networked, interactive game system. The disclosed methods are geared towards reducing network lag by determining course-corrected positional values for a shared global object through two-way blending. The "blending" discussed in the patent includes the steps of the network simulation sending the calculation of a pose for the local player on the local console. The console blends the local and network simulations. The methods also blend shared global objects by using the blended pose of the local player to determine a positional value for the shared global object on the local console. The present invention is again superior to the technology of the '929 patent at least because the '929 patent does not disclose a client device that uses transmitted lookup tables from a server to match user input to motion vectors and tags and sums those motion vectors. The '929 patent also does not disclose the application of those summed motion vectors to the decoded frames to estimate motion in those frames. The present invention is also superior because it does not require the presence of a client with extremely high processing power, reduces input-feedback latency, which is significantly reduced by using player input motion compensation instead of waiting for the server to return output video.

U.S. Pat. No. 8,069,258, ("the '258 patent") is directed to using local frame processing to reduce apparent network lag of multiplayer simulations. The methods described include intercepting inputs from a local user, determining the state data of a remote object in a network simulation from a previous game frame, and determining the interactions of nondeterministic objects from multiple game systems that are part of the networked simulation. That interaction data, along with the state data and local input, is used to generate a local simulation of the video frame. In this manner, the local and network simulations can run asynchronously for a single frame, with each frame corresponding to a single time phase within the game. This allows the local simulation updates in real-time during networked gameplay, while remaining (essentially) synchronized with the network. The present invention is once more superior to the technology of the '258 patent at least because the '258 patent does not disclose a client device that uses transmitted lookup tables from a server to match user input to motion vectors and tags and sums those motion vectors. The '929 patent also does not disclose the application of those summed motion vectors to the decoded frames to estimate motion in those frames. The present invention is also superior because it does not require the presence of a client with extremely high processing power, reduces input-feedback latency, which is significantly reduced by using player input motion compensation instead of waiting for the server to return output video.

U.S. Pat. No. 9,665,334 B2 ("the '334 patent"), discloses systems and methods for rendering protocols applying multiple processes and a compositor to render the combined graphics on a display. The technology operates as follows: when the server simultaneously provides a game screen to a number of client devices, the calculation load of the rendering processing on the server becomes heavy in, for example, a game content which requires quick responsiveness. That is, the number of client devices to which the server can provide a screen is limited depending on its rendering performance and required responsiveness. By contrast, when each client device is controlled to execute processing which can be executed by general rendering performance to share the rendering processes between the server and client device, a screen can be provided to more client devices. Also, in general, a game screen which is rendered without applying texture mapping has high compression efficiency, and can be sent with a smaller bandwidth via a network such as the Internet. The present invention is superior to the technology discussed in the '334 patent at least because it does not disclose generating motion vectors at a server based on predetermined criteria and transmitting the generated motion vectors and one or more invalidators to a client, which caches those motion vectors and invalidators. It further does not disclose having the server instruct the client to receive input from a user, and use that input to match to cached motion vectors or invalidators, where those vectors or invalidators are used in motion compensation. The present invention is also superior because it reduces input-feedback latency, which is significantly reduced by using player input motion compensation instead of waiting for the server to return output video.

U.S. Pat. No. 9,736,454 ("the '454 patent"), discloses systems and methods for encoding comprising examining availability of a depth block co-located with a texture block, determining a prediction method for a texture block on the basis of availability of a co-located depth block, and deriving a first prediction block for the texture block on the basis of the availability of the co-located depth block. Again, the present invention is superior to the technology discussed in the '454 patent at least because it does not disclose generating motion vectors at a server based on predetermined criteria and transmitting the generated motion vectors and one or more invalidators to a client, which caches those motion vectors and invalidators. It further does not disclose having the server instruct the client to receive input from a user, and use that input to match to cached motion vectors or invalidators, where those vectors or invalidators are used in motion compensation. The present invention is also superior because it reduces input-feedback latency, which is significantly reduced by using player input motion compensation instead of waiting for the server to return output video.

U.S. Pat. No. 9,705,526 ("the '526 patent"), discloses systems and methods for entropy encoding in media and image applications. The technology discloses a system where compression begins with receiving a source of image and or video data as indicated. A lossless compression scheme is then applied. A predictor/delta computation unit then takes the input and tries to reduce the redundancy in the input data using a delta computation between neighboring input elements. Then these values are encoded using a predefined statistical modeling in an entropy encoder to produce the compressed image and/or video data. Similar to the above, the present invention is superior to the technology discussed in the '526 patent at least because it does not disclose generating motion vectors at a server based on predetermined criteria and transmitting the generated motion vectors and one or more invalidators to a client, which caches those motion vectors and invalidators. It further does not disclose having the server instruct the client to receive input from a user, and use that input to match to cached motion vectors or invalidators, where those vectors or invalidators are used in motion compensation. The present invention is also superior because it reduces input-feedback latency, which is significantly reduced by using player input motion compensation instead of waiting for the server to return output video.

U.S. Pat. No. 8,873,636 B2 ("the '636 patent"), is directed to a moving-image distribution server (such as one running an online game) that provides coded image data to the user's PC, running the local instance of the game. In order to perform this process, in relevant detail, the CPU of the of the user's PC specifies the region to be referred to in order to decode the motion vector associated with the selected block in the preceding frame screen. It does so by referring to the motion vector associated with the selected block (a vector that is included in the preprocessing information it is provided) and extracts the image of the region as a reference image. As is the case with the other references, the present invention is superior to the technology discussed in the '636 patent at least because it does not disclose generating motion vectors at a server based on predetermined criteria and transmitting the generated motion vectors and one or more invalidators to a client, which caches those motion vectors and invalidators. It further does not disclose having the server instruct the client to receive input from a user, and use that input to match to cached motion vectors or invalidators, where those vectors or invalidators are used in motion compensation. The present invention is also superior because it reduces input-feedback latency, which is significantly reduced by using player input motion compensation instead of waiting for the server to return output video.

International Patent Publication No. WO2009138878 A2 ("the '878 Publication") is directed to processing and streaming multiple interactive applications in a centralized streaming application server, while controlling the levels of detail and post-filtering of various rendered objects. In the system, a centralized interactive application server, at its video pre-processor, performs spatial and temporal filtering on the frame sequence prior to encoding a compressed stream of audio-visual content to client devices, which decode the compressed stream and display the content. The GPU command processor of the centralized interactive application server includes a module that also computes a motion compensation estimate for each macroblock in the target encoded frame in the video encoder. Nevertheless, the present invention remains superior to the technology discussed in the '878 Publication at least because it does not disclose generating motion vectors at a server based on predetermined criteria and transmitting the generated motion vectors and one or more invalidators to a client, which caches those motion vectors and invalidators. It further does not disclose having the server instruct the client to receive input from a user, and use that input to match to cached motion vectors or invalidators, where those vectors or invalidators are used in motion compensation. The present invention is also superior because it reduces input-feedback latency, which is significantly reduced by using player input motion compensation instead of waiting for the server to return output video.

U.S. Pat. No. 9,358,466 B2 ("the '466 patent"), is directed to improving videogame performance through the reuse of cached data. The systems disclosed score cache performance of different generated video game missions at least in part by identifying the digital assets used, and determining whether the identified digital assets are in a cache. Cache scores can be calculated based on a cache re-use rate corresponding to a proportion of digital assets for a mission that are already in a cache. Other techniques for generating cache scores may account for factors such as the overall size of combined digital assets for a mission that are already in a cache and/or overall size of combined digital assets for a mission that are not already in a cache. By caching data in this manner, that data, and other non-cached data requests, become more efficient. The present invention remains superior to the technology discussed in the '466 patent at least because it does not disclose caching repetitive motion vectors, calculating a motion estimate from the input data or updating the stored motion vector library based on the input data, so that a client can use the stored motion vector library to initiate motion prior to receiving actual motion vector data from a server.

U.S. Pat. No. 6,903,662 B2 ("the '662 patent), is directed to a configurable computer input device, specifically one that caches input data to maintain quicker response times. The system operates by checking key presses against an internal memory (or cache) to determine if the particular key has been previously identified. If the system has not communicated with the key before this point, the system may then retrieve data corresponding to the input from its key memory. The system will then update its internal memory (cache) with the key identity and its corresponding data. The system may then send the input data from the key to the host computer. However, the next time the system encounters the same key in the pressed state, it can query its own memory (cache) instead of retrieving the same scan code from the key memory again. The present invention is superior to the technology discussed in the '662 patent at least because it does not disclose caching repetitive motion vectors, calculating a motion estimate from the input data or updating the stored motion vector library based on the input data, so that a client can use the stored motion vector library to initiate motion prior to receiving actual motion vector data from a server.

Japanese Patent No. JP6129865B2 ("the '865 patent"), discloses systems and methods for transmit[ting] the rendered game content data for the subsets of path segments to a game client for caching on the local cache so that the game content data may be available when needed during real-time game play. Again, the present invention is superior to the technology discussed in the '865 patent at least because it does not disclose caching repetitive motion vectors, calculating a motion estimate from the input data or updating the stored motion vector library based on the input data, so that a client can use the stored motion vector library to initiate motion prior to receiving actual motion vector data from a server.

U.S. Pat. No. 9,762,919 ("the '919 patent"), discloses systems and methods for caching reference data in a block processing pipeline. The '919 patent technology discloses a cache memory (e.g., a fully associative cache) that may be implemented, for example in a local (to the pipeline) memory such as SRAM (static random access memory), to which portions of the chroma reference data (e.g., 64-byte memory blocks) corresponding to motion vectors determined for macroblocks at earlier stages of the pipeline may be prefetched from the memory. Chroma cache logic may maintain the cache, and may extend over multiple stages of the pipeline. Fetches for the motion vectors of a given macroblock passing through the pipeline may be initiated by the chroma cache logic one or more stages prior to the chroma motion compensation stage to provide time (i.e., multiple pipeline cycles) to read the respective memory blocks from the memory into the cache before chroma motion compensation needs it. However, the '919 patent remains deficient compared to the present invention. The present invention is superior to the technology discussed in the '919 patent at least because it does not disclose caching repetitive motion vectors, calculating a motion estimate from the input data or updating the stored motion vector library based on the input data, so that a client can use the stored motion vector library to initiate motion prior to receiving actual motion vector data from a server.

As is apparent from the above discussion of the state of the art in this technology, there is a need in the art for an improvement to the present computer technology related to the encoding of real-time game environments.

SUMMARY OF THE INVENTION

It is therefore an object of the present invention to disclose systems and methods for reducing latency through motion compensation techniques in which a client device uses transmitted lookup tables from a server to match user input to motion vectors, and tag and sum those motion vectors. When a remote server transmits encoded video frames to the client, the client decodes those video frames and applies the summed motion vectors to the decoded frames to estimate motion in those frames.

It is another object of the present invention to disclose systems and methods in which the encoded video frames are decoded without residual handling.

It is yet another object of the present invention to disclose systems and methods for reducing latency through motion compensation techniques in which the client applies one or more smoothing functions to the summed tagged motion vectors in the queue.

It is yet another object of the present invention to disclose systems and methods for reducing latency through motion compensation techniques in which the tags associated with the motion vectors at the client device are chronological in nature.

It is another object of the invention to provide systems and methods for reducing input-feedback latency by generating motion vectors at a server based on predetermined criteria and transmitting the generated motion vectors and one or more invalidators to a client, which caches those motion vectors and invalidators. The server instructs the client to receive input from a user, and use that input to match to cached motion vectors or invalidators. Based on that comparison, the client then applies the matched motion vectors or invalidators to effect motion compensation in a graphic interface.

It is another object of the invention to provide systems and methods for reducing input-feedback latency by caching motion vectors in a look-up table.

It is yet another object of the invention to provide systems and methods for reducing input-feedback latency by associating invalidators with one or more cached motion vectors.

It is yet another object of the invention to provide systems and methods for reducing input-feedback latency by instructing the client to delete one or more cached motion vectors if the input is matched to a cached invalidator associated with the one or more motion vectors.

It is another objective of the present invention to disclose systems and methods for reducing latency by caching repetitive motion vectors at a server that transmits a previously generated motion vector library to a client. The client stores the motion vector library, and monitors for user input data. The server instructs the client to calculate a motion estimate from the input data and instructs the client to update the stored motion vector library based on the input data, so that the client applies the stored motion vector library to initiate motion in a graphic interface prior to receiving actual motion vector data from the server.

It is another object of the present invention to disclose systems and methods for reducing latency by caching repetitive motion vectors in which the server transmits a context update to the client to disable application of the stored motion vector library.

It is yet another object of the present invention to disclose systems and methods for reducing latency by caching repetitive motion vectors in which one or more scaling factors is applied to the motion vector library.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is a diagram exemplarily illustrating an example macroblock during the player motion compensation of FIG. 3 in which two sets of tagged motion vectors are shown;

FIG. 4B is a diagram exemplarily illustrating an example macroblock during the player motion compensation of FIG. 3 in which summed motion vectors are shown;

FIG. 4C show a diagram exemplarily illustrating an example macroblock during the player input motion compensation of FIG. 3 in which an example shifted macroblock is shown;

FIG. 6A shows an exemplary macroblock undergoing player input motion compensation and blending for the alternative method shown in FIG. 5, where the example macroblock is being shifted to the right;

FIG. 6B shows an exemplary macroblock undergoing player input motion compensation and blending for the alternative method shown in FIG. 5, where actual motion vectors are shown;

FIG. 6C show an exemplary macroblock undergoing player input motion compensation and blending for the alternative method shown in FIG. 5, where the resulting motion is shown;

DETAILED DESCRIPTION OF THE PREFERRED EMBODIMENTS

Figure 1:
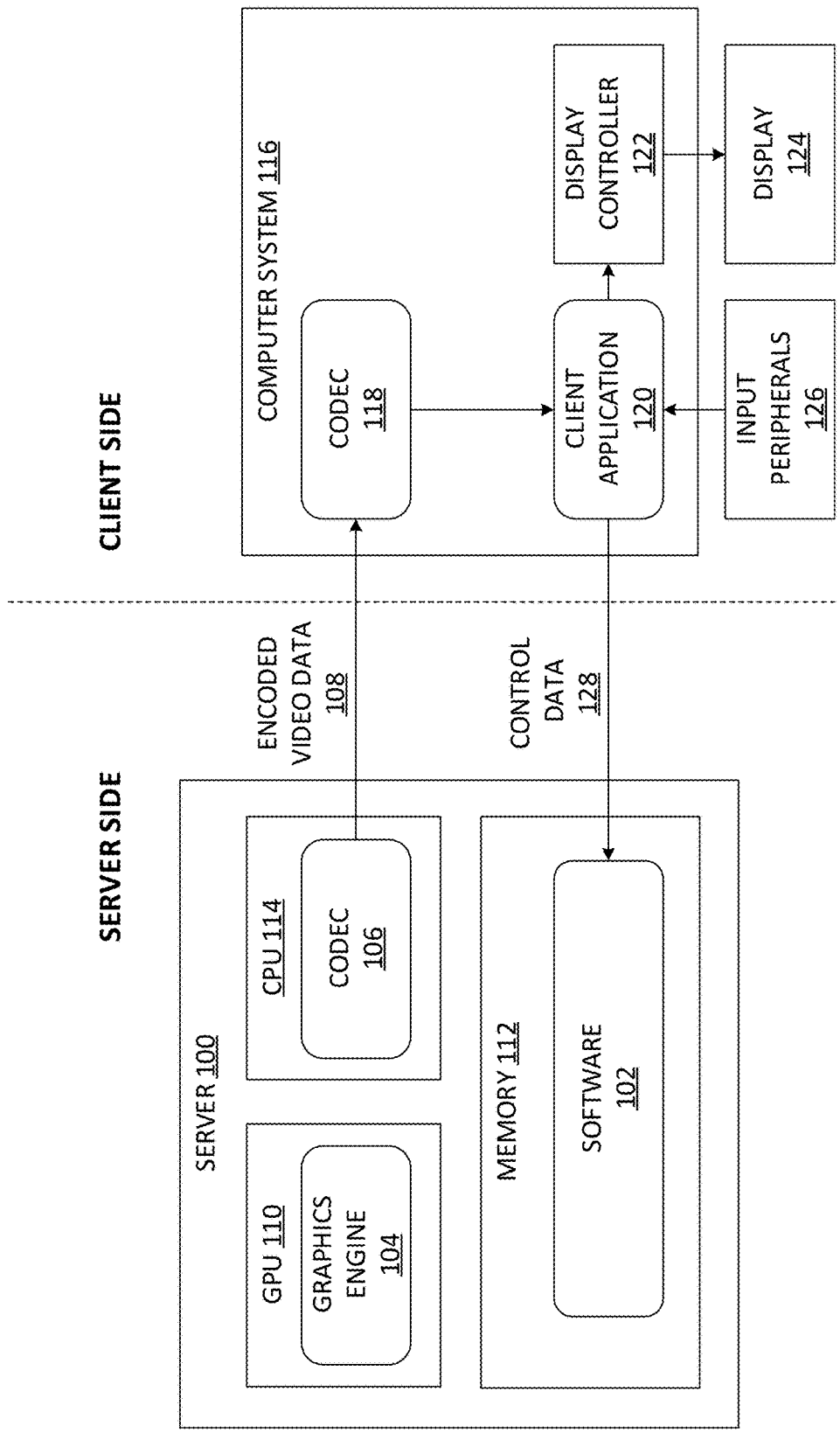
FIG. 1 is a block diagram exemplarily illustrating a remote gaming system in which a videogame is running on a server while being controlled by input at a remote client.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Certain types of player input make better candidates for player input motion compensation. Two factors contribute to a given input's suitability: the player sensitivity to input-feedback latency, and the difficulty of implementing player input motion compensation without introducing significant artifacting. Each input will need to be evaluated for suitability. For example, in a first-person shooter game, the player will be very sensitive to mouse-based view rotation, a fraction of a second delay, as little as 16 ms, between player input and video output will be noticeable. However, in the same situation, gamepad controller-based view rotation is typically slower and players might be less sensitive to input-feedback latency. View rotation can be approximated by shifting the scene in the opposite direction of the rotation but there may be undesirable artifacting along the edge of the image in the rotation direction. For small view rotations, such as adjusting aim on an onscreen enemy, players may not even notice edge artifacting. In another example, accelerating a car in a driving game may be low priority for player input motion compensation due to lack of player sensitivity and/or inertia to latency, but steering and braking inputs may be high priority because players will notice input-feedback latency.

The time between receiving a player input and displaying a motion output is the player-feedback latency. By using motion compensation, an estimated motion can provide feedback almost immediately while waiting for the server to process the player input. In this way, the player-feedback latency is dramatically reduced in game streaming applications. By implementing player input motion compensation in a game streaming application, a motion estimate can be provided in the next available frame. By contrast, it takes several frames for input to travel to the server, produce an output frame, and return. Player input motion compensation may also provide some benefit in traditional non-streamed game applications where the game engine and renderer may have a player-feedback latency of a few frames.

The client will not have the appropriate context to track an object's movement around the screen. Player input motion compensation will not be suitable for cases where the location of specific macroblocks or video objects is unknowable to the client. For example, on a 2D-platformer game, the character can move around the screen from left to right. The client will not know where the character is located when the player presses the jump input; therefore player input motion compensation alone cannot be used in this case to reduce input-feedback latency.

In general, the motion vectors for player input motion compensation should be generated ahead of time. For motion such as player camera rotation, the motion vectors can be calculated based on how the game weights the input. In certain embodiments, the motion vectors may be the input value multiplied by the sensitivity weight. For motion that can't be directly calculated, such as animated movement, the animation may be triggered during development such that the motion vectors may be measured directly and stored. Measuring motion vectors can be accomplished through the same motion estimation techniques performed during H.264 encoding.

FIG. 1 illustrates an example system in which a video game is controlled by a remote client. In this system, a server 100 hosts video game software 102 and a graphics engine 104 which renders video output. The video is encoded in a codec (also referred to as a coding engine or encoder) 106 and the encoded video data 108 is transmitted to a remote client. The server architecture 100 may be any combination of hardware or software which can support the functions of both graphics engine 104 and codec 106. In the given example, the graphics engine 104 may be implemented as, for example, a GPU 110 controlled by video game software 102 loaded into some computer readable memory 112, while the codec 106 may be implemented as a CPU 114 running video encoding software.

The remote client is composed of a computer system 116 capable of running a client-side codec 118 to decode the transmitted encoded video data 108 and a client application 120 to apply the player input motion compensation. The client computer system 116 also contains a display controller 122 to drive display hardware 124. The input from the client-side input peripherals 126 will be converted by the client application 120 into control data 128 which is transmitted back to the game software 102 running on the server 100. The input from the peripherals 126 will also be used to determine what, if any, player input motion compensation to apply as illustrated in more detail by FIG. 2.

Figure 2:
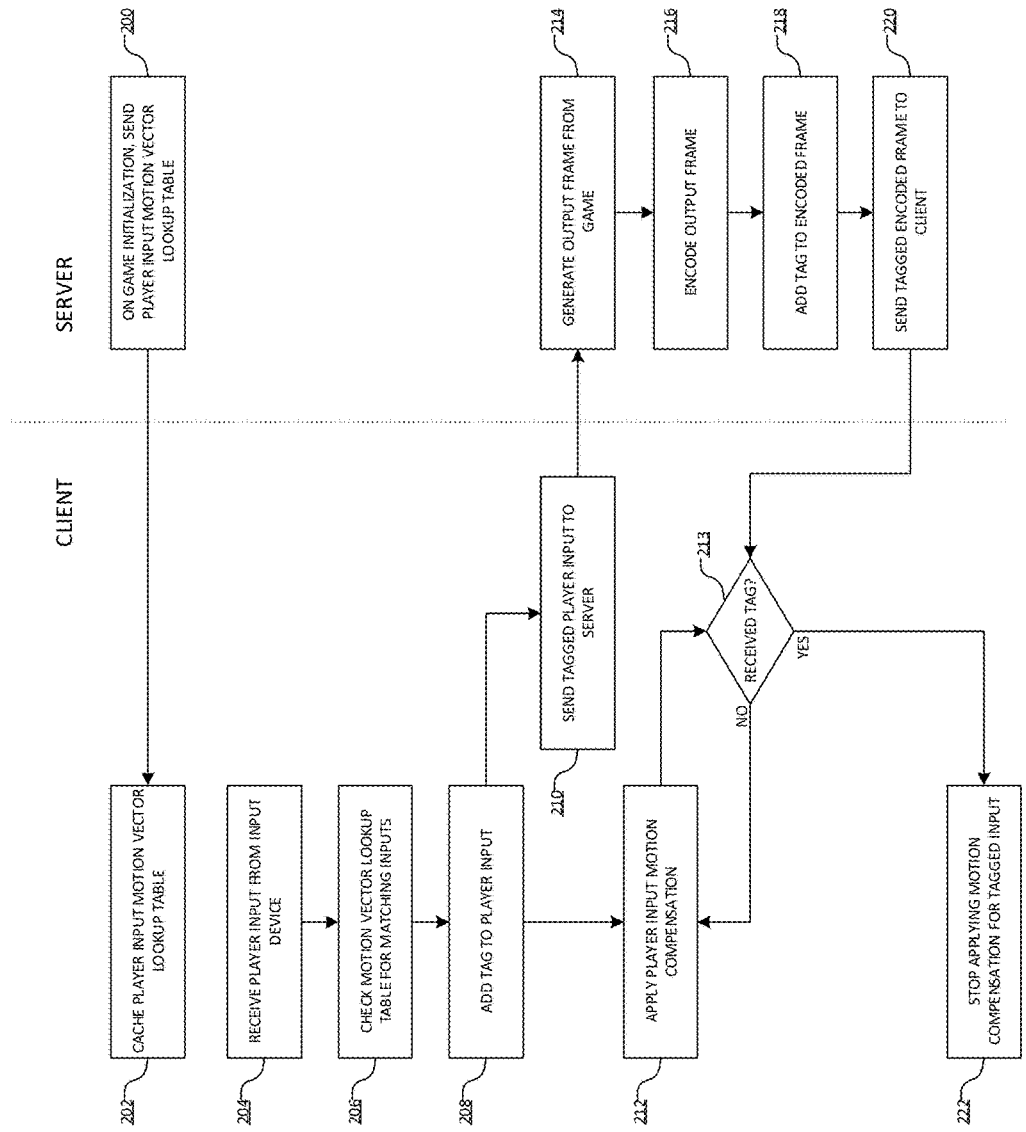
FIG. 2 is a flow chart exemplarily describing the reduction in input-feedback latency in game streaming applications by applying motion compensation for an appropriate player input.

FIG. 2 is a flow chart describing the steps required to perform player input motion compensation for a single input. When the client initializes, the server sends a lookup table containing inputs and their associated motion vectors at step 200, which is then cached by the client at step 202. In this implementation, the client is generalized to serve the needs of multiple streaming games. In certain embodiments, a game-specific client can skip steps 200 and 202 because it already contains the lookup table for the game. In an alternate implementation, a game-specific client may permanently store the motion vector lookup table without the need to cache from the server.

When the client receives player input from an input device such as a mouse or gamepad controller at step 204, the client application will check the cached motion vector lookup table for matching inputs at step 206. If there is no matching player input, the client will take no additional action and send input to the server without additional modification. If there is a matching player input in the cache, the client will apply player input motion compensation. Optionally, the cache may be capable of changing entries in the lookup table based on player input. For example, when the player hits the pause button, all player-movement inputs should be disabled until the player exits the pause screen. In one implementation, the client-controlled lookup table may have two sets of inputs, one for use in the pause menu and one for use outside the pause menu, that are switched, preferably by the client, whenever the player selects the pause input. In an alternate implementation, the server may switch the contents of the cached lookup table on the client.

When the client application receives player input for motion compensation, the client will add a tag to the player input and its associated motion vectors at step 208. The tagged input is sent to the server at step 210. The tag is any identifier that can correlate player input to a future frame. For example, the tag may be an integer that is incremented each time the client receives input that will be used to perform player input motion compensation. The tag can be added as metadata in the same network packet as the player input or sent in a similar messaging pattern that keeps the tag information synced with the input information. The client confirms whether or not tagged a tag is received at step 213. While the player input is being tagged and sent, the client applies the motion vectors contained in the cached lookup table at step 212. These motion vectors will be applied for each incoming frame until the correlating tag is returned from the server. A detailed description of an exemplary method to apply these motion vectors is illustrated in FIG. 3.

When the server receives tagged player input, the tagged player input is passed to the game, which generates an output frame at step 214. The video image is then encoded at step 216. Before the encoded frame is sent back to the client, the player input tag is attached to the encoded frame at step 218. This is the same tag that was previously sent with the player input and signifies that the output frame contains the actual video feedback from the player input. Attaching a tag to the encoded frame can be accomplished by adding the tag as metadata to the same network packet as the encoded frame. The tagged encoded frame is sent back to the client at step 220. When the client receives an encoded frame with a tag, the client can correlate the tag to a previous player input motion compensation. The client then stops applying the previous motion compensation at step 222.

Figure 3:
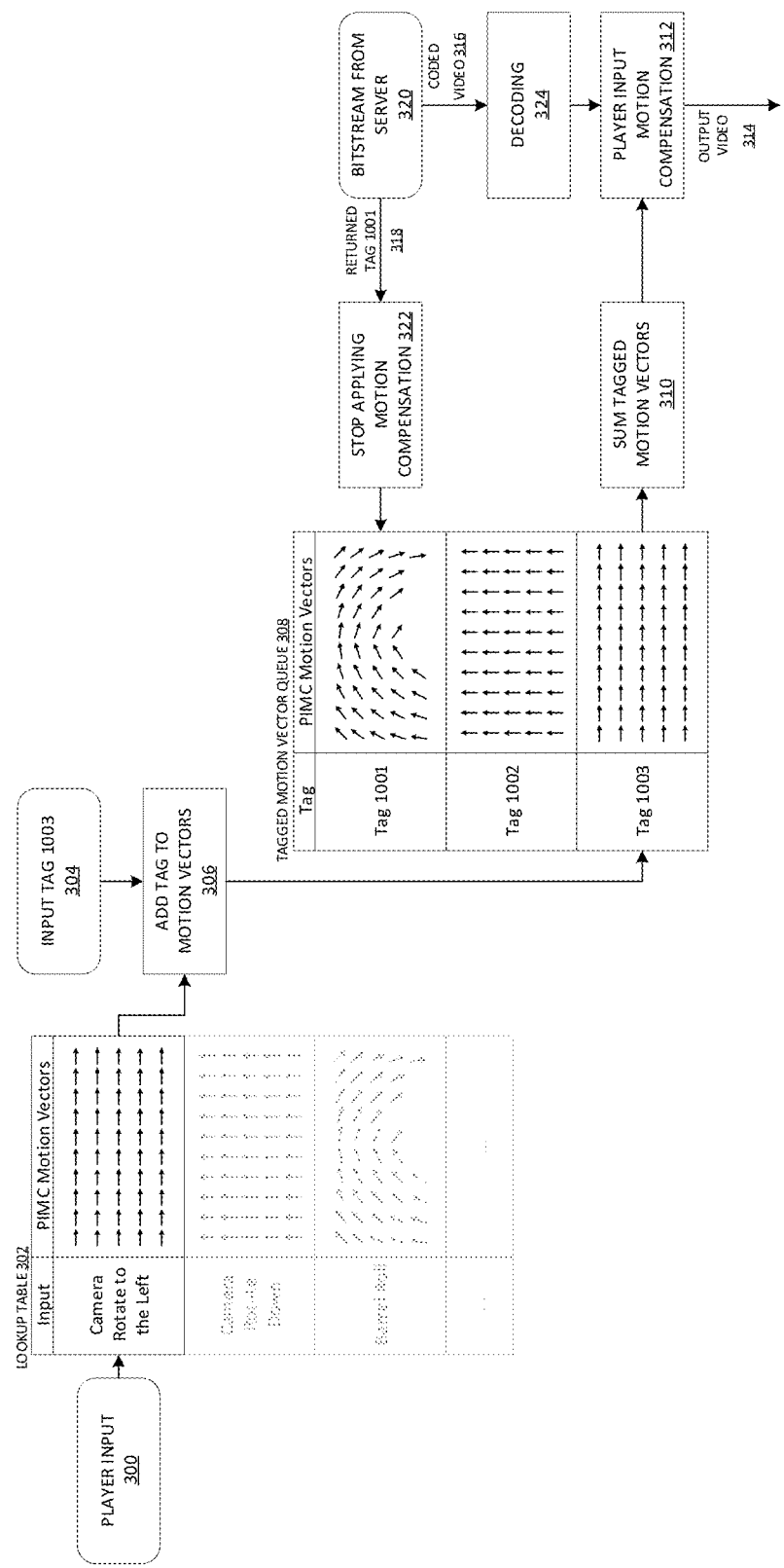
FIG. 3 is a block diagram exemplarily illustrating an example moment during the runtime of a videogame streaming environment that is utilizing player input motion compensation.

FIG. 3 is an illustration of an example moment during the runtime of a videogame streaming environment that is utilizing player input motion compensation. When the client receives any player input at step 300, it will be compared to the motion vector lookup table at step 302. If there is a matching player input, the associated motion vectors will be used for player input motion compensation. The motion vectors are tagged at step 306 with a unique input tag at step 304. In this example, the chosen tag is the integer "1003." The tagged motion vectors are added to a queue at step 308 containing any other tagged motion vectors currently being used for player input motion compensation.

The next frame arrives in the bitstream from the server at step 320. This frame is tagged with a unique identifier at step 318, in this case, the integer "1001," which indicates that the frame contains the resultant motion of all previous player inputs up to and including the input corresponding to tag "1001." The tag "1001" indicates to the client that it can stop applying motion compensation at step 322 for this tagged input. The motion vectors with the tag "1001" are then removed from the tagged motion vector queue at step 308 along with any motion vectors with earlier tags that may remain in the queue in the case that previous packets have been lost.

The coded video 316 is decoded at step 324. Meanwhile, the remaining motion vectors in the motion vector queue at step 308 are summed at step 310. The motion vectors are typically vector fields with a vector for each macroblock in the image. To sum the motion vectors, the vectors are summed element-wise so that the result is a vector field with a vector for each macroblock. The sum of two vector fields is the vector sum of the vectors for each point in the field, so the sum of two sets of motion vectors is the vector sum for each macroblock in the image. The sum of two vectors is defined as the component-wise sum of their components, which may be represented as $\{u_1, u_2\}+\{v_1, v_2\}=\{u_1+v_1, u_2+v_2\}$. In this example, two sets of motion vectors with tags "1002" and "1003" are contained in the queue; these two sets of motion vectors are summed. The tags are chronological in nature, which allows the client to know the ordering of the previously tagged player inputs. This lets the client discard tagged motion vectors up to and including the return tag in an incoming frame. Additionally, the tagging discussed above is computationally cheaper than more complex methods. Optional smoothing functions can be applied at this point to prevent clamping artifacts or to mitigate similar introduced-artifacting.

Clamping artifacts are introduced when macroblocks are moved offscreen and manifest as a smearing of pixel color perpendicular to the screen edge. An example smoothing function would reduce the strength of outward-pointing motion vectors as they get closer to the edge of the image. Only the outward-directional component needs to be weakened, the y-component for outward-pointing vectors towards the top and bottom edges of the image and the x-component for outward-pointing vectors towards the left and right edges of the image. For vectors that point towards the border, the vector component could be multiplied by the square of the distance from the edge so that as the distance from the border approaches zero, the vector component will approach zero. In this example, an outward-pointing vector towards the right edge of the image will be transformed from $\{x,y\}$ to $\{x*d*d,y\}$ where d is the distance from the edge. This will mitigate the clamping artifacts in exchange for some slight image distortion around the border of the image. The distortion is far less noticeable to the player than the clamping artifacts.

After the decoding process completes at step 324 on the encoded video frame, the summed motion vectors are used in motion compensation at step 312. The resulting video is output at step 314. This output contains the player input motion compensation data and will be displayed on the client. This outputted frame is the first frame containing a motion estimate for the input with correlation tag "1003." This outputted frame also contains a motion estimate for the previous input with correlation tag "1002," for which the client is still waiting for the server to return actual motion vectors. This outputted frame is also the first frame to contain the actual motion vectors for a previous input with correlation tag "1001," for which the client had been previously estimating motion. As a consequence, three motion estimation states exist at this point in the method: one new estimation state for new inputs; one continued estimation state that is awaiting actual results; and another estimation state that is stopped because actual results have arrived at the client.

FIG. 4 is a diagram illustrating an example macroblock during the player input motion compensation step of FIG. 3. The player input motion compensation step is procedurally similar to the process performed during H.264 decoding where decoded motion vectors are used to determine where macroblocks in the current frame have moved from in the previous frame. For player input motion compensation, the applied motion vectors will estimate the future feedback for a player input by moving macroblocks in the current frame before displaying the output video to the player. FIG. 4A shows the two sets of tagged motion vectors in the queue at step 400 from the example tagged motion vectors shown at step 308 in FIG. 3. These two sets are summed by taking the vector sum for each macroblock in the image to create one set of motion vectors at step 402 in FIG. 4B. Each one of the motion vectors in this set represents the estimated movement for each macroblock in the current frame. For each vector in the summed motion vectors at step 402, a corresponding macroblock in the example image of FIG. 4C will be shifted. One example macroblock is shown in FIG. 4C being shifted by its corresponding player input motion vector at step 404. Each macroblock in the example image will be shifted in this manner. The example image in FIG. 4C contains only 50 macroblocks, but a high definition image will contain thousands of macroblocks. The example motion vectors shown in FIG. 4 show uniform rigid motion, but the described player input motion compensation technique can be used with motion vectors of arbitrary complexity to describe rotations, vibrations, or other complex motions in screenspace that are known in the art.

Figure 5:
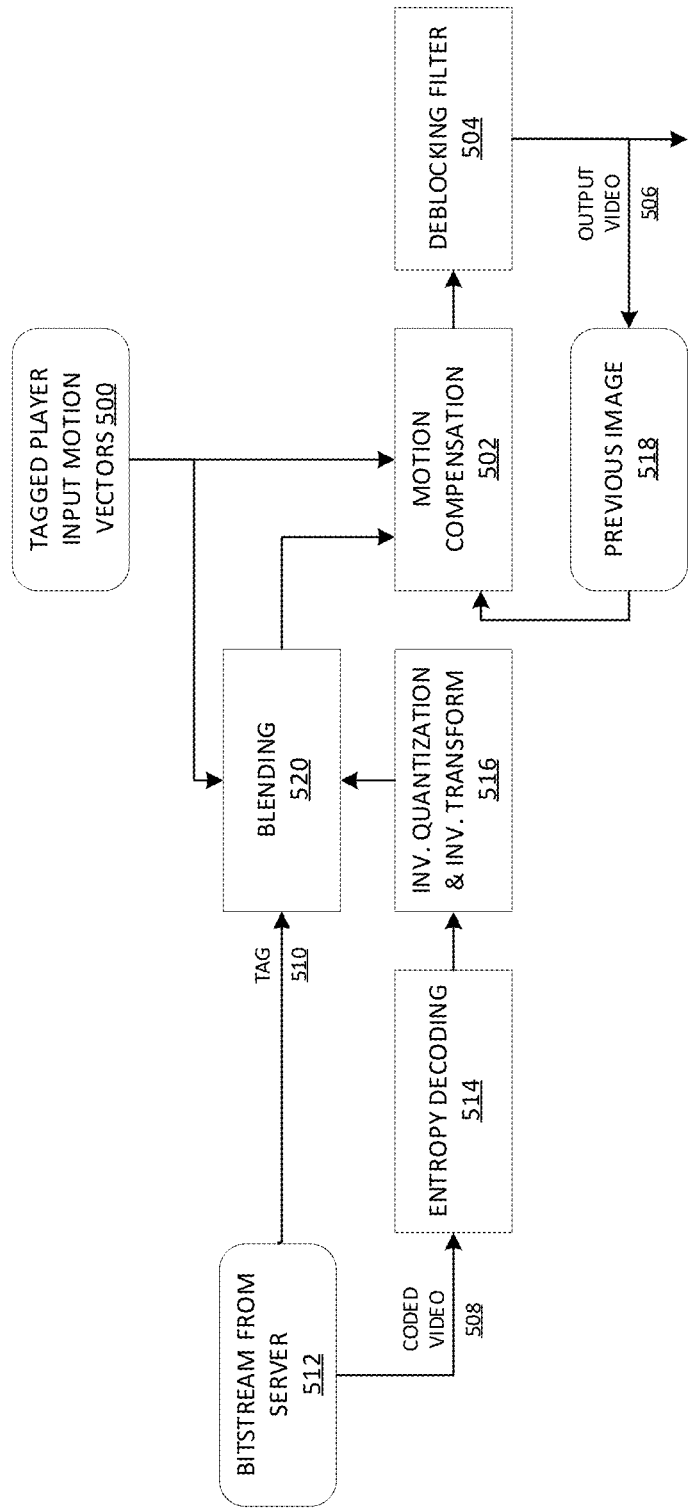
FIG. 5 is diagram exemplarily illustrating an alternative method to apply motion vectors during player input motion compensation on the client.

FIG. 5 is an illustration of an alternative method to apply motion vectors during player input motion compensation on the client. In certain embodiments of this method, it is not necessary to handle residuals during encoding and decoding of video. After a matching player input is found in the lookup table, the associated motion vectors are tagged at step 500 and used for player input motion compensation as shown in steps 208 and 212 in FIG. 2. During the decoding process on the next frame, the player input motion vectors are added to the decoded motion vectors and injected into the motion compensation step at step 502, defined in the H.264 coding standard. The deblocking filter, as defined by the H.264 coding standard, is applied at step 504, but should only be applied to blocks that have not been modified by player input motion compensation. The resulting output, shown at step 506, contains the player input motion compensation and will be displayed on the client. The output is subsequently buffered at step 506 and at step 518, becomes the previous image for use in motion compensation on the next frame. Unlike the implementation in FIG. 3, in this implementation, the tagged player input motion vectors are only applied once. This means that they do not need to be summed with all the tagged motion vectors in the queue, because the previous image, shown at step 518, will contain the sum of previous tagged motion vectors. The time between receiving the input and displaying the video output is the input-feedback latency, which will have been significantly reduced by using player input motion compensation instead of waiting for the server to return output video.

At the same time as step 500, the client will send the corresponding tagged player input to the server, as shown in steps 208 and 210 in FIG. 2. The client will eventually receive coded video as shown at step 508 with the same tag 510 in the bitstream from the server at step 512, as shown in step 220 in FIG. 2. The tag 510 associated with the video signifies that the actual motion previously estimated by player input motion compensation is represented in the encoded video, as shown at step 508. The encoded video passes through entropy decoding at step 514 and inverse quantization & inverse transformation at step 516, as defined by the H.264 coding standard.

The previous player input motion compensation step, which has been performed prior to steps 508, 510, 512, 514, and 516, described in the preceding paragraphs, has already shifted the macroblocks that the actual motion vectors from the encoded frame are trying to shift. Therefore, applying the actual motion vectors directly will shift incorrect macroblocks. The bitstream will contain two related pieces of data: the encoded video frame and a correlation tag. The encoded frame is sent to entropy decoding at step 514, while the tag is sent ahead to the blending process at step 520. To compensate, the blending process at step 520 supplies correction motion vectors by calculating the difference between the incoming actual motion vectors and the previously used player input motion vectors 500 with a matching correlation tag. The difference can be calculated by adding the inverse motion vectors for the correlation tag to the actual motion vectors and is described in more detail in connection with FIG. 6. The correction vectors are used in place of the decoded motion vectors for motion compensation at step 502. The remainder of the decoding pipeline continues as usual with the deblocking filter at step 504, the next output video frame at step 506, and buffering the output at step 518. These steps may continue to repeat for each frame indefinitely. In general, the blending process of step 520 occurs after the inverse quantization (step 514) and inverse transform (step 516), since the actual motion vectors will not be available until this point. Once the actual motion vectors are available, the blending process will use them to calculate the difference between actual and estimated motion vectors.

FIG. 6 illustrates an example macroblock undergoing player input motion compensation and blending. At time 0 ms, the player presses the input to rotate the camera view to the left. The associated player input motion compensation motion vectors, shown as "PIMC" 600, from the lookup table are applied to all macroblocks in the next frame. FIG. 6A shows an example macroblock being shifted to the right. The results of player input motion compensation appear in the next decoded frame, resulting in a maximum input-feedback latency of 16 ms, the length of one frame, for video running at 60 frames per second. In other embodiments, the maximum input-feedback latency may be 33 ms for video running at 30 frames per second. It is thus contemplated that the invention operates across a variety of framerates, limiting the maximum input-feedback latency to the length of one frame. When the tagged video returns from the server, it contains the actual motion vectors 602 encoded by the server, as shown in FIG. 6B. For this example, the coded video returns at time 100 ms but this will be heavily dependent on network latency. The actual vectors 602 refer to macroblocks that have already been shifted during player input motion compensation 600, so the actual vectors 602 cannot be applied directly to the existing frame. Instead, the correction vectors 604 need to be calculated by finding the difference between the actual vectors 602 and the player input motion vectors 600. The difference can be calculated by adding the inverse player input motion vectors to the actual motion vectors. Finding these vector differences is referred to as blending at step 524 in FIG. 5. The smaller the correction vector 604, the more successful the player input motion compensation method was at estimating the actual motion vectors. The resulting motion 608 shown in FIG. 6C for the example macroblock is the same as the actual motion vector 602. This example illustrates how player input motion compensation can estimate the video feedback for a player input and show the result for the time between 16 ms and 100 ms, while an unmodified system would not display any player-feedback until 116 ms after the player input is received.

During development, game developers will need to decide which motions and animations will send anticipated motion vectors during runtime. Unique yet predictable motion vectors are the best candidates for anticipated motion vectors. A categorical example would include animations that are adaptively altered by the engine, such as animations that use kinematics equations to calculate joint angles, animations that are time-warped, or animations that are otherwise stretched or compressed. For example, a ledge grab animation plays when a player gets within range of a defined ledge and jumps. The ledge grab animation is stretched so that the player's hands are on the ledge but are still attached to the player's body. The animation plays out over a defined number of frames, placing the player on top of the ledge. The start point in this example is variable, with a range of acceptable locations and orientations. This ledge grab animation is a good candidate for generating anticipated motion vectors because the exact animation is not known ahead of time but is programmatically generated by the game engine on-demand. The client especially cannot know the motion vectors for this animation as the client does not have any contextual information about the player location in a game streaming environment.

Anticipated motion vectors will only be useful over a limited contextual or temporal scope such as a specific camera location, a small window in time, or some other specific player-context. For each set of anticipated motion vectors, a corresponding invalidator needs to be generated. The invalidator may be used on the client to prevent anticipated motion vectors from being applied after they would be valid. In certain embodiments, an invalidator may be a set of any player inputs that would change the game context, such that playing the anticipated motion vectors is no longer viable. In other embodiments, an invalidator may be a time window for which anticipated motion vectors may be valid. In yet other embodiments, an invalidator may be a combination of invalidating inputs and a time window. For example, the anticipated motion vectors generated for a ledge grab animation are only valid within a limited player location and orientation, and as such, an invalidator would necessarily include any translational or rotational movement input. Invalidators will need to be designed and implemented during the development of the anticipated motion vector feature. Anticipated motion vectors may also be disabled or updated by events or messages sent from the server as described below in connection with FIGS. 10 through 13, which discuss using cached repetitive motion vectors for motion compensation.

Anticipated motion vectors may be generated ahead of time or they may be generated as needed during runtime. For animations that have a limited number of permutations, for instance, the anticipated motion vectors can be generated offline by triggering each permutation and recording the motion vectors. In certain embodiments, for a generalized client, the motion vectors would be stored server-side and then sent to the client to be cached on-demand. When the motion vectors are sent to the client, they are cached in the lookup table. Pre-generated anticipated motion vectors may be stored at the server and will be available as a game-readable file format which allows the server to send pre-generated motion vectors to be cached in the lookup table on the client during the runtime of the game. Animations that are generated during runtime, such as animations calculated through inverse kinematics, cannot be pre-generated because there may not be a discrete number of possible animation permutations. Inverse kinematics is a method commonly used in real-time rendering to fit an animation within a set of boundary conditions. For example, a player character in a videogame wants to grab a nearby ledge, the boundary conditions will be defined by the locations where the player's hands hit the ledge and the ledge-grab animation will be altered accordingly through inverse kinematics. For adaptively altered animations such as these, the game may speculatively render possible animations into an offscreen motion vector image during runtime and record the anticipated motion vectors as needed. For example, if the player is near a grabbable ledge, the game may anticipate the player will grab the ledge soon, and the game may speculatively render the ledge grab animation to generate anticipated motion vectors. Adaptively altered animations that will need anticipated motion vectors to be generated during runtime will need to be identified by a developer ahead of time.

Existing game systems that describe player context, such as player location tracking, scripting systems, trigger volumes, or pathfinding systems, can be used to generate an event that will signal when the game needs to speculatively render an animation. For example, a game may track the player's proximity to a grabbable-ledge and signal the game to speculatively render the ledge grab animation and record the anticipated motion vectors. Certain animations like picking up a weapon, pulling a lever, or pushing a button may be stretched or adjusted based on player proximity to the interaction and player orientation. These animations have too many permutations to make pre-generation feasible, but could also be generated during runtime, as exemplarily shown in FIG. 7. Motions that play out in the same manner every time can be generated and recorded offline. These are typically motions that occur in the same screen space at the same rate every time they are triggered. Motion vectors for these animations can be recorded offline by triggering all possible permutations of the animation and recording the game-generated motion vectors or generating motion vectors through more traditional motion estimation techniques such as those used in the H.264 codec. In a preferred embodiment, game-generated motion vectors, as described above in connection with FIGS. 1 through 6, are used to ensure high quality motion estimates. This process can occur at any point during development, but it is preferable to add this process as a stage during the build process or some other existing asset-conditioning process, such as pre-generating mip-maps and the level of details ("LODs"). Asset conditioning may include any process that compiles game assets from human-readable source formats into machine-readable formats. For example, mip-maps may be generated ahead of time by converting artist-created texture files into game-ready formats that contain multiple resolutions. Similarly, LODs may be generated ahead of time by converting artist-created model files into game-ready formats that contain multiple levels of detail. Motion vector generation can be added to an existing asset-conditioning process that converts artist-generated animation formats into game-ready formats.

Figure 7:
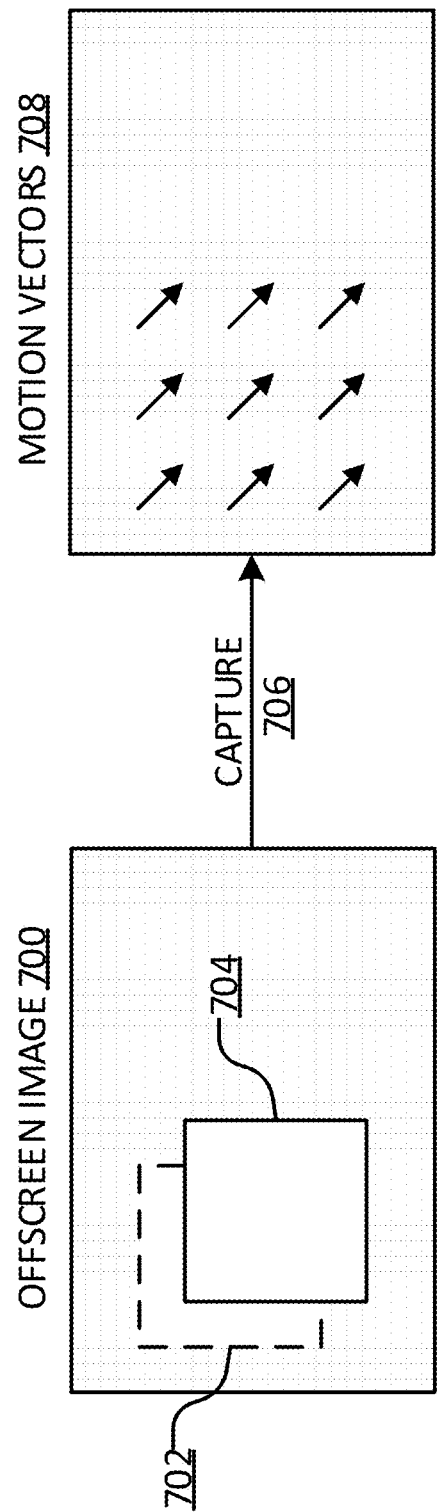
FIG. 7 is a diagram illustrating runtime generation of anticipated motion vectors.

FIG. 7 illustrates an example method for generating motion vectors in offline or runtime scenarios. The animations can be rendered to an off-screen surface/image, step 700, and the motion vectors can be recorded for immediate use. Only the portions of the screen that move will need to be rendered, the other objects in the scene can be ignored. The dashed object, shown at step 702, and solid object, shown at step 704, represent the position of an animated object in a previous frame and current frame respectively. The movement from the previous frame to the current frame will be captured at step 706 in the form of motion vectors, shown at step 708. The motion vectors may be captured from the game-generated motion vectors or captured through more traditional motion estimation techniques such as those used in the H.264 codec. In a preferred embodiment, game-generated motion vectors, as described in above in connection with FIGS. 1 through 6, are used to ensure high quality motion vectors. Several frames' worth of anticipated motion vectors can be quickly calculated for a given animation by repeating the process illustrated by steps 700 through 708, until motion vectors have been generated for all required frames. Not all of the frames in the animation need to be generated, just enough need to be generated to play on the client while the video stream catches up. The minimum number of generated frames will depend on the delay between sending player input and receiving the resultant video stream on the client; and the length of the generated portion of an animation should be at least as long as the delay. The anticipated motion vector frames may be rate-scaled during playback as described below in connection with FIGS. 10 through 13, which discuss the use of cached repetitive motion vectors in motion estimation. If the playback of anticipated motion vector frames is rate-scaled, generating anticipated motion vectors for a portion of an animation equal to the delay will result in a playback rate scaling of 50%. Generating motion vectors for a longer portion of the animation will result in playback that is less-aggressively rate-scaled.

The macroblock size used for video encoding should be considered when recoding the motion vectors, and there should be a motion vector for each macroblock. In the preferred embodiment, game-generated motion vectors are generated as per-pixel motion vectors and transformed into per-macroblock motion vectors by finding the arithmetic mean for each macroblock group of per-pixel motion vectors.

Figure 8:
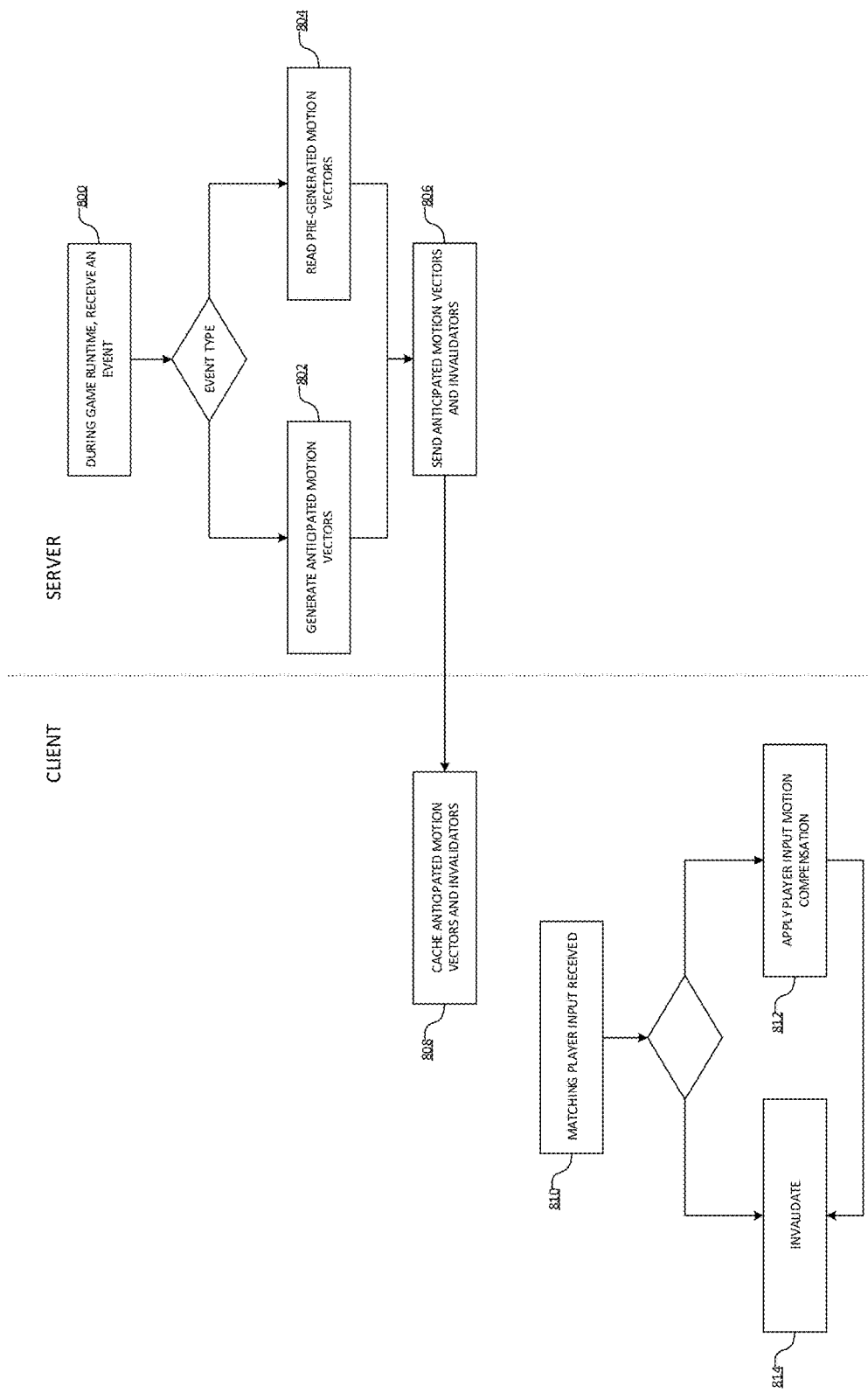
FIG. 8 is a flow diagram exemplarily illustrating the transmission and client-side storage of anticipated motion vectors for the purpose of player input motion compensation.

FIG. 8 illustrates the transmission and client-side storage of anticipated motion vectors for the purpose of player input motion compensation. During the development of the video game software, events need to be configured to signal upcoming input-driven context-sensitive animations. For example, a game developer would like to send anticipated motion vectors so that they will be available when the player performs a ledge grab animation. The developer implements an event that will be triggered whenever the player is both facing and within range of a grabbable-ledge. In this example, when the player gets close to a grabbable-ledge while playing the game, the example event is received at "DURING GAME RUNTIME, RECEIVE AN EVENT," step 800. The event type will describe whether the anticipated motion vectors will need to be generated, as in the case of adaptively altered animations, or whether the anticipated motion vectors have been pre-generated offline, as in the case of animations which are never altered but play infrequently or are dependent on player-context. In the above example, the ledge grab animation is stretched based on the player's distance from the ledge, which means that motion vectors will need to be generated at runtime at "GENERATE ANTICIPATED MOTION VECTORS," step 802. In another case, the motion vectors may have been generated offline and read from storage at "READ PRE-GENERATED MOTION VECTORS," step 804.

One example of pre-generated motion vectors may be switching between weapons in a large arsenal. The number of possible weapon-switch permutations can grow quite large, making it impractical to cache the entire set of resulting motion vectors. In general, if motion vectors take up an excessive quantity of space in the limited cache and are not used frequently enough, they are not prime candidates for pre-caching. The anticipated motion vectors are sent to the client at "SEND ANTICIPATED MOTION VECTORS AND INVALIDATORS," step 806. The anticipated motion vectors are added to the motion vector lookup table at "CACHE ANTICIPATED MOTION VECTORS AND INVALIDATORS," step 808. In one embodiment, the invalidation system functions similarly to the system that triggers the application of motion vectors in the lookup table but disables the motion vectors instead. When a set of motion vectors and invalidators is received at "CACHE ANTICIPATED MOTION VECTORS AND INVALIDATORS," step 808, the invalidators will need to be registered by the invalidation system.

The player input motion compensation method, as described above in connection with FIGS. 1 through 6, compares all player inputs to the entries in the motion vector lookup table. In the above example, when the player enters the required input to initiate the ledge grab animation, the input will match the previously cached input in the lookup table at "MATCHING PLAYER INPUT RECEIVED," step 810. If the cached anticipated motion vectors have not yet been invalidated, the anticipated motion vectors will be applied at "APPLY PLAYER INPUT MOTION COMPENSATION," step 812. If a matching player input will invalidate the anticipated motion vectors, or if the anticipated motion vectors expire after a predetermined time, or if the anticipated motion vectors expire after being applied once, the anticipated motion vectors are removed from the lookup table at "INVALIDATE," step 814 and are not applied.

Figure 9:
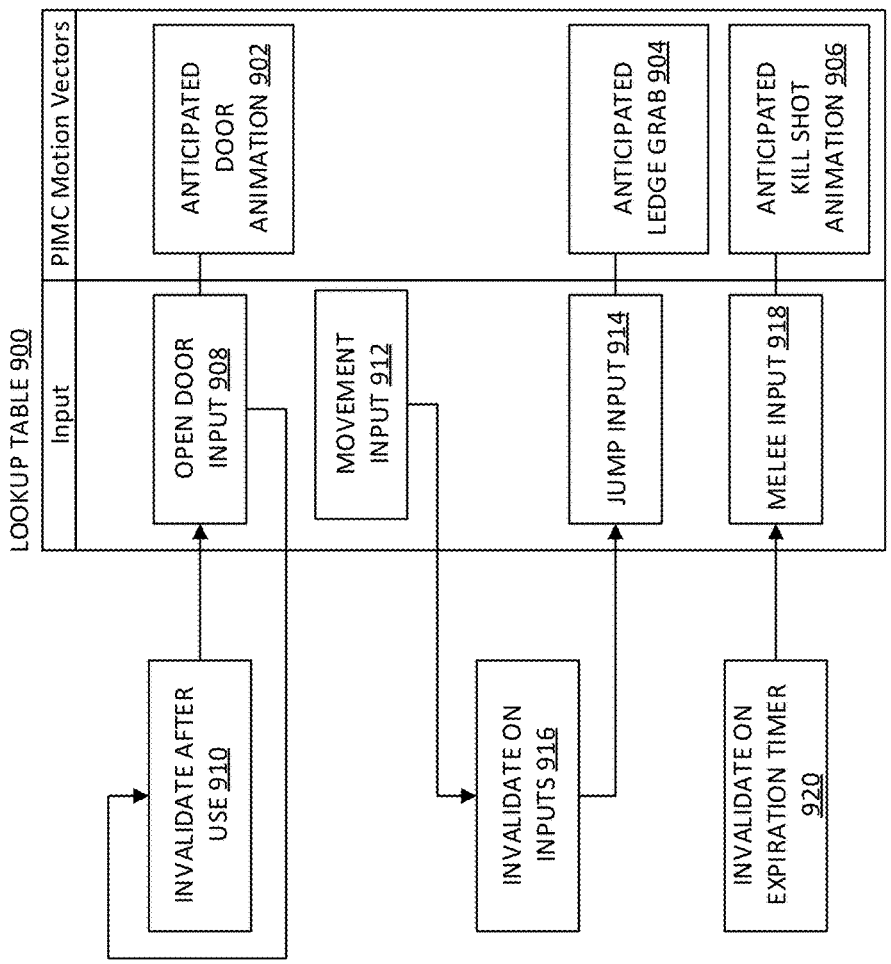
FIG. 9 is a diagram illustrating an exemplary process of invalidating anticipated motion vectors.

FIG. 9 describes an exemplary method of signals that may invalidate an anticipated motion vector set. Invalidation is a type of update to the lookup table where a set of anticipated motion vectors is removed from the lookup table, which is preferably cached at the client. In addition to responding to update events received from the server, the update mechanism may monitor for player inputs and contain invalidation countdown timers. When a set of anticipated motion vectors is cached in the lookup table, its invalidator will likely be registered with the update function/mechanism. An invalidator is any data signal that triggers an invalidation update to the lookup table. The example lookup table, "Lookup Table," shown at step 900, contains three sets of anticipated motion vectors: an anticipated door animation, shown at "ANTICIPATED DOOR ANIMATION," step 902, an anticipated ledge grab animation, shown at "ANTICIPATED LEDGE GRAB," step 904, and an anticipated kill shot animation, shown at "ANTICIPATED KILL SHOT ANIMATION," step 906. Anticipated motion vectors may be invalidated after being applied once. In the example, the anticipated door animation motion vectors shown at "ANTICIPATED DOOR ANIMATION," step 902, are applied when the player presses the input at "OPEN DOOR INPUT," step 908, to open a nearby door. Simultaneously, the open door input at "OPEN DOOR INPUT," step 908, is deregistered and the anticipated door animations, shown at "ANTICIPATED DOOR ANIMATION," step 902, may be removed from the lookup table at "INVALIDATE AFTER USE," step 910. Similarly, other inputs may invalidate anticipated motion vectors before they are applied. In the example, a set of anticipated motion vectors for a ledge grab animation shown at "ANTICIPATED LEDGE GRAB," step 904, are only valid within a limited distance from a ledge.

If the player moves away from the ledge by using the movement input, shown at "MOVEMENT INPUT," step 912, before the player jumps to grab the ledge (by using the jump input, shown at "JUMP INPUT," step 914), then the anticipated ledge grab motion vectors shown at "ANTICIPATED LEDGE GRAB," step 904 will be invalidated at "INVALIDATE ON INPUTS," step 916. Other examples of invalidating inputs may be cases in which the player has a grappling hook or some other movement-based weapon that would invalidate anticipated motion vectors, and cases in which the player pushes a button that activates a special ability. As invalidating inputs are context-specific, others may be apparent based on the particular implementation. Anticipated motion vectors may also expire over time. In the example, a kill shot opportunity is only presented to the player for a three-second window. If the player does not press the melee input, shown at "MELEE INPUT," step 918, within the three-second window, the motion vectors for an anticipated kill shot animation, shown at "ANTICIPATED KILL SHOT ANIMATION," step 906, will be invalidated at "INVALIDATE ON EXPIRATION TIMER," step 920. Anticipated motion vectors may have multiple invalidators and vice versa. For example, an anticipated ledge grab may be invalidated if a movement input is received or after the ledge grab motion vectors are used, whichever comes first.

Figure 10:
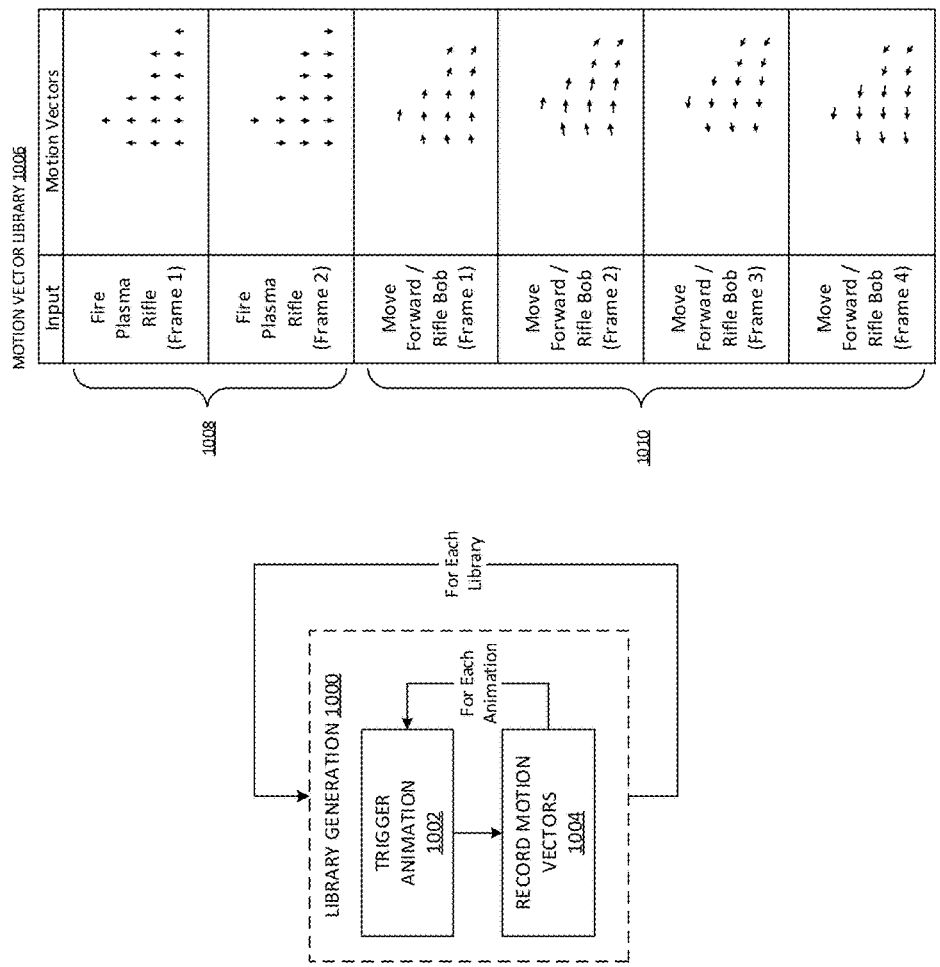
FIG. 10 is a diagram showing an exemplary method for generating the motion vector library and an example repetitive motion vector library for caching purposes.

FIG. 10 shows an example method for generating the motion vector library and an example repetitive motion vector library for caching purposes. Since the motions selected are highly repetitive in nature, they will play in the same manner every time they are triggered. This makes it possible to generate motion vectors ahead of time and organize them into libraries. Motion vector library generation can occur at any point during development, but it may make sense to add this process as a stage during the build process or some other asset conditioning phase. In this example, a motion vector library will be generated for each available weapon in a first-person shooter. When library generation for the first weapon begins at "LIBRARY GENERATION," step 1000, the first weapon animation is triggered at "TRIGGER ANIMATION," step 1002 and the motion vectors are recorded at "RECORD MOTION VECTORS," step 1004. The motion vectors may be game-generated or generated through more traditional motion estimation techniques such as those used in the H.264 codec. In a preferred embodiment, game-generated motion vectors, as described in U.S. Provisional Application Nos. 62/488,256 and 62/634,464, incorporated here in their entireties, are used to ensure high quality motion estimates. If the recorded motion vectors are not accurate or correctly quantized, they will introduce artifacts when used during player input motion compensation. The steps 1002 and 1004 repeat until the motion vectors have been recorded for each highly-repetitive animation in the library. Library generation starts again at step 1000 until all libraries are generated.

The example shown at "MOTION VECTOR LIBRARY," step 1006 is a greatly simplified version of a repetitive motion vector library for a plasma rifle weapon in a first-person shooter game. This example is simplified to include two simple animations: one 2-frame animation for the feedback animation that plays when the player fires the plasma rifle, shown at step 1008, and one 4-frame animation for the bobbing motion of the rifle that occurs when the player walks forward, shown at step 1010. In a typical, real-world environment, a weapon would likely have more animations and the animations may be much longer than four frames.

Figure 11:
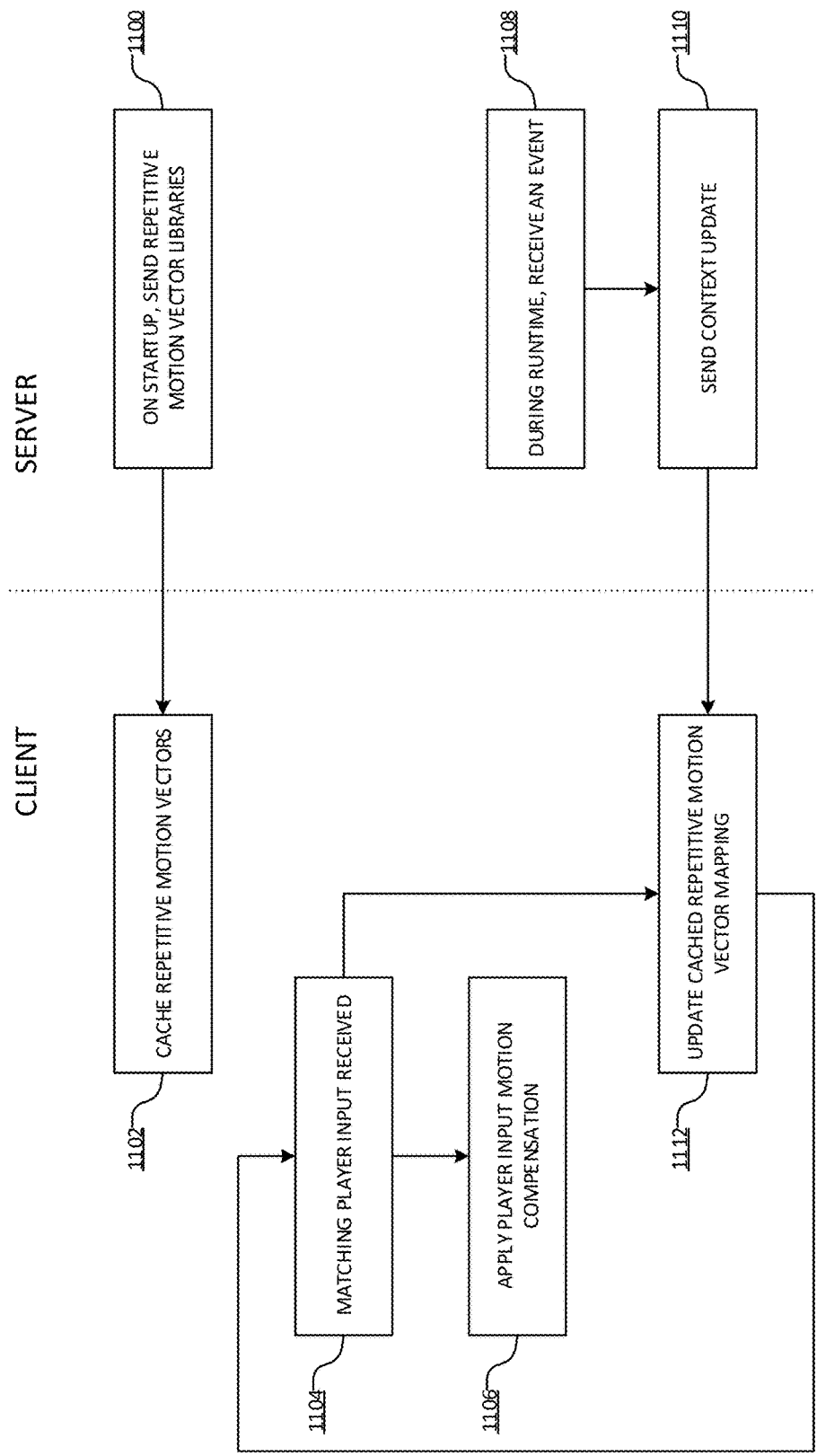
FIG. 11 is a flow diagram exemplarily illustrating the process to cache, apply, and update motion vector libraries for player input motion compensation.

FIG. 11 illustrates the process to cache, apply, and update motion vector libraries for player input motion compensation. When the game initializes, the server will send the pre-generated motion vector libraries to the client at "ON STARTUP, SEND REPETITIVE MOTION VECTOR LIBRARIES," step 1100. The client stores the motion vector libraries in memory, typically in the form of a lookup table, at "CACHE REPETITIVE MOTION VECTORS," step 1102. In this implementation, the client is generalized to serve the needs of multiple streaming games. In an alternate implementation, a game-specific client may permanently store the motion vector libraries without the need to cache repetitive motion vectors from the server.

At this point, the client can start monitoring for player input and comparing the incoming inputs to entries in the player input motion compensation lookup table. When an incoming input has a matching entry in the lookup table at "MATCHING PLAYER INPUT RECEIVED," step 1104, the motion vectors associated with the player input are used to provide a motion estimate as exemplarily described in connection with FIGS. 1 through 10, at "APPLY PLAYER INPUT MOTION COMPENSATION," step 1106. There may be certain cases where receiving a specific input may require the lookup table to be altered at "UPDATE CACHED REPETITIVE MOTION VECTOR MAPPING," step 1112. An example of an input that would alter the lookup table is the pause button, which may disable player inputs such as character movement, weapon firing animations, or other play-related motions. After applying the motion vectors and optionally updating the lookup table, the client will continue to monitor for player input. After the lookup table is updated at "UPDATE CACHED REPETITIVE MOTION VECTOR MAPPING," step 1112, incoming player input will be compared to the updated entries in the lookup table.

At any point during the game's runtime, a change in context for the player may require the lookup table to be altered. For example, the player may switch weapons requiring the cached motion library to be switched from the previously held weapon to the new weapon. An exemplary implementation may see the server-side game monitoring for specific game events. These events will be configured by methods known in the art during game development and may be sent over the game's existing messaging or event system. When a running game instance receives one of these events at "DURING RUNTIME, RECEIVE AN EVENT," step 1108, a message will be generated and transmitted to the client at "SEND CONTEXT UPDATE," step 1110. A context update may be sent for any game event that changes the relationship between player input and the motion vectors contained in the lookup table. Context updates may enable or disable a player input from triggering a set of motion vectors, change the motion vectors associated with a given input, or otherwise add or remove associations between player input and motion vectors for player input motion compensation. When the message reaches the client, the lookup table is altered according to the changing context at "UPDATE CACHED REPETITIVE MOTION VECTOR MAPPING," step 1112.

Figure 12:
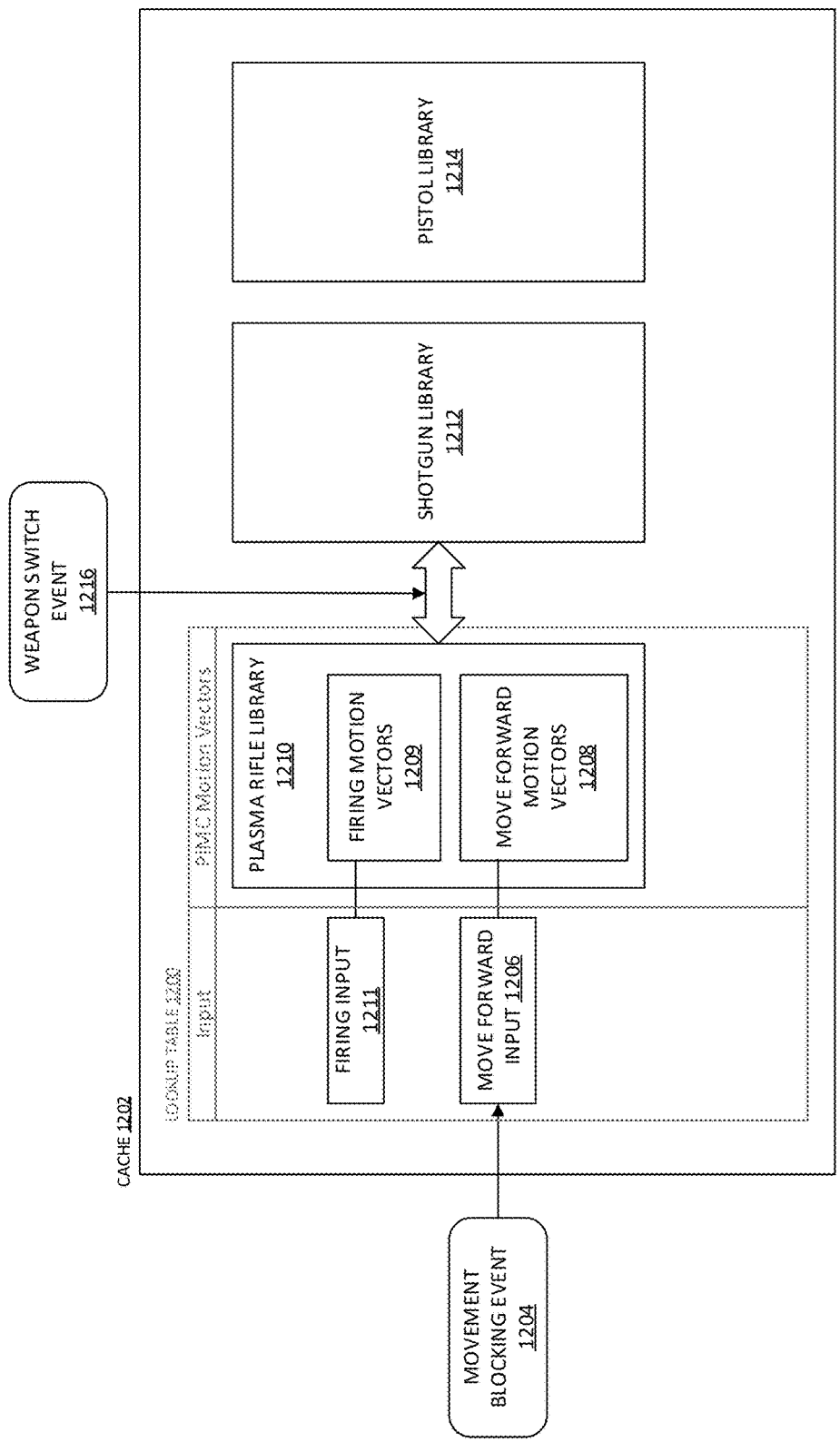
FIG. 12 is a diagram exemplarily illustrating how the motion vector mapping may be updated.

FIG. 12 is a diagram illustrating how the motion vector mapping may be updated. The lookup table 1200, which was stored in the client's cache 1202, is used by the client to find which motion vectors are associated with a given player input. There may be times during runtime of the game where contextual changes alter the behavior of player inputs. For example, if a player is moving forward but hits a movement blocker such as a wall, the predicted motion vectors for forward movement will need to stop being applied. When this happens, the server will send a context update to the client as shown in step 1110 in FIG. 11. This movement blocking event 1204 is received, which signals the client to disable the connection between the move forward input 1206 and the corresponding motion vectors 1208. The forward movement motion vectors will stop being applied when the player uses the forward movement input until another event from the server re-enables the connection between the move forward input and the move forward motion vectors. For this example, the game will generate an event when the player's movement becomes unblocked and transmit the context update to the client to reestablish the connection between the forward input and the move forward motion vectors in the lookup table.

In another example, the player is holding the plasma rifle but switches to a shotgun. The plasma rifle motion vector library 1210 is stored in the cache along with its firing motion vectors 1209, which correspond to a specific firing input 1211. The cache also stores motion vector libraries for other weapons including a shotgun 1212 and pistol 1214. When the client receives the weapon switch event 1216 from the server, the plasma rifle motion vector library 1210 is switched out of the lookup table 1200 for the shotgun motion vector library 1212. To prevent player input motion compensation from improperly occurring during the weapon switch, two events can be used in tandem to first disable the plasma rifle motion vector library 1210 while a weapon switch animation plays, and then switch the two motion vector libraries after the weapon switch animation completes.

For longer multi-frame motion vectors, it is possible to stretch out their application such that the last frame of motion vectors is applied as the last frame of actual video is received from the server. This will allow the server to catch up to the estimated motion at the moment when the client runs out of cached motion vectors. The scaling factor for the motion vectors is defined as the playbackSpeedScale, exemplarily calculated as shown below.

$$playbackSpeedScale = \frac{cached\ animation\ time}{cached\ animation\ time + delay}$$

Where the delay is defined as the time between the initial player input event and receiving the actual video on the client. This delay includes the time it takes to send the input over the network to the server, processing on the server including game logic, rendering logic, GPU rendering time, and encoding time, and the network time to return the video back to the player. The delay should already be continuously measured in any game streaming environment. The preferred embodiment of player input motion compensation uses a correlation tag, as described in U.S. Prov. App. Nos. 62/488,256 and 62/634,464, to correlate player input and actual video. Before an incoming player input is sent to the server, a correlation tag is attached as a unique identifier. When a video frame returns from the server with a correlation tag, the client matches the unique identifier to a previous input. This signals the client to stop estimating motion for the correlated input or undo a previous motion estimation through blending techniques. The length of the cached portion of the animation, or cached animation time, can be calculated by multiplying the number of frames in the cached animation by the length of each frame.

Figure 13:
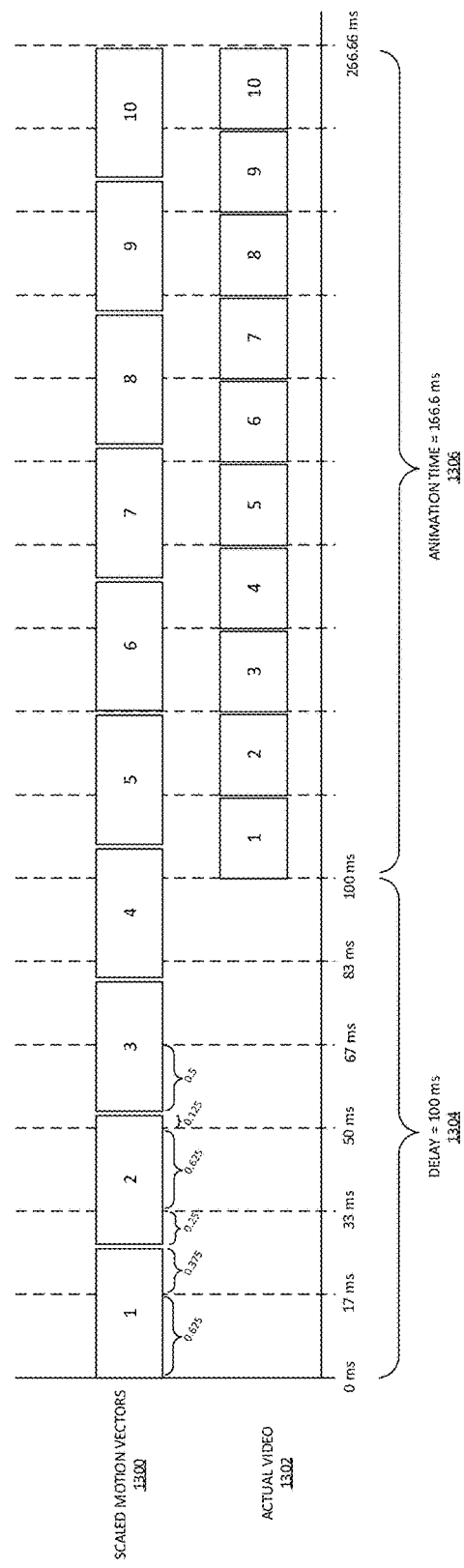
FIG. 13 is a diagram illustrating an exemplary modification for applying multi-frame motion vectors during player input motion compensation, especially in the case of cached motion vectors.

In FIG. 13, an exemplary animation containing 10 frames is used for player input motion compensation in a game running at 60 frames per second with a delay of 100 ms. When the player input triggers the player input motion compensation, the playbackSpeedScale is calculated for the cached motion vectors as shown below.

$$playbackSpeedScale = \frac{cached\ animation\ time}{cached\ animation\ time + delay}$$

$$playbackSpeedScale = \frac{10\ frames * \frac{1000\ ms}{60\ frames}}{\left(10\ frames * \frac{1000\ ms}{60\ frames}\right) + 100\ ms}$$

$$playbackSpeedScale = \frac{166.66\ ms}{166.66\ ms + 100\ ms} = 0.625$$

The player input was received at time 0 ms. The playback rate of the motion vectors is scaled 1300 by the calculated playbackSpeedScale. The first frame of motion vectors is applied to the next available frame in the video stream from the server. The scaled motion vector frames will be interpolated to keep the animation smooth. Since the motion vector frames are scaled over multiple frames, interpolation is a method which may be used to calculate "how much" of the motion vector to apply on any given frame. An exemplary implementation may use a linear interpolation based on the calculated playbackSpeedScale. For our example, the calculated playbackSpeedScale is 0.625 which will stretch one set of motion vectors over 1.6 display frames. Interpolation is a method to calculate how much of a motion vector to apply on a given frame. That is, interpolation calculates how far to move a macroblock down a motion vector when the set of motion vectors is stretched over multiple display frames. Only a portion of the first scaled motion vectors should be applied on the first display frame at 17 ms, equal to the playbackSpeedScale of 0.625. On the second display frame at 33 ms, the remainder of the first scaled motion vectors is applied, calculated as 1−0.625=0.375, then the first portion of the second scaled motion vectors is applied, calculated as the playback speed scale minus the remaining portion of the first scaled motion vectors or 0.625−0.375=0.25. On the third display frame at 50 ms, the second set of scaled motion vectors continues to be applied, the macroblocks are moved the next 62.5% down the motion vectors. On the fourth display frame at 67 ms, the remainder of the second scaled motion vectors is applied, calculated as 1−0.25−0.625=0.125, and the first portion of the third scaled motion vectors is applied, calculated as the playback-SpeedScale minus the remaining portion of the second scaled motion vectors 0.625−0.125=0.5. Linear interpolation continues as the scaled motion vectors are applied.

Multi-frame motion vectors may send a correlation tag for each frame of the cached animation to correlate each frame of estimated motion to future actual video.

The delay will depend greatly on the network path and architecture between client and server. This example uses a 100 ms delay but delays could vary between dozens to hundreds of milliseconds. Shorter delays will provide a better player experience, but player input motion compensation techniques can help to disguise the impact of high delay times in certain cases. After a delay 1304, the actual video is received 1302. For edge-located servers, or servers that are physically close to consumers, delay times might be as low as 30 ms. For more typical server locations, 100 ms is more likely. The actual video retains the original animation length 1306 because it has not been scaled. The actual video is applied in accordance with player input motion compensation techniques.

If the client cannot perfectly blend out previous motion compensation, the H.264 coding standard provides a redundant slice feature that can correct any temporally propagated errors. Based on the H.264 profile settings, each slice will be encoded as an intra slice (I-slice) and sent on a rotating schedule at a certain frequency. Since intra slices will not contain motion vectors, the blend motion vectors should be applied only when actual motion vectors arrive in p-slices. This will prevent blend motion vectors from being applied on macroblocks that have appeared in an I-slice before the tagged frame returns from the server.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A computer-implemented method for caching motion vectors comprising:
generating one or more motion vectors at a server, wherein the motion vectors are generated based on predetermined criteria;
transmitting the generated motion vectors and one or more invalidators to a client, wherein the generated motion vectors and invalidators are cached at the client;
transmitting an instruction to the client to receive input from a user, wherein the client is configured to match the input to cached motion vectors or invalidators; and transmitting an instruction to the client to apply the matched motion vectors or invalidators to effect motion compensation in a graphic interface.

2. The method of claim 1, wherein the motion vectors are cached in a look-up table.

3. The method of claim 1, wherein the one or more invalidators are associated with one or more cached motion vectors.

4. The method of claim 3, wherein the one or more invalidators are configured to disable the one or more cached motion vectors.

5. The method of claim 1, further comprising the step of instructing the client to delete one or more cached motion vectors if input is matched to a cached invalidator associated with the one or more motion vectors.

6. The method of claim 1, wherein the motion vectors are unique and predictable.

7. The method of claim 1, wherein the motion vectors are generated ahead of time or during runtime.

8. The method of claim 1, wherein the motion vectors are stored at the server and sent to the client to be cached on-demand.

9. The method of claim 1, wherein the motion vectors are game-generated.

10. The method of claim 9, wherein the game-generated motion vectors are generated as per-pixel motion vectors and transformed into per-macroblock motion vectors.

11. A system for caching motion vectors, wherein over a network, a server:

generates one or more motion vectors, wherein the motion vectors are generated based on predetermined criteria;

transmits the generated motion vectors and one or more invalidators to a client, wherein the generated motion vectors and invalidators are cached at the client;

transmits an instruction to the client to receive input from a user, wherein the client is configured to match the input to cached motion vectors or invalidators; and transmits an instruction to the client to apply the matched motion vectors or invalidators to effect motion compensation in a graphic interface.

12. The system of claim 11, wherein the motion vectors are cached in a look-up table.

13. The system of claim 11, wherein the one or more invalidators are associated with one or more cached motion vectors.

14. The system of claim 13, wherein the one or more invalidators are configured to disable the one or more cached motion vectors.

15. The system of claim 11, further comprising the step of instructing the client to delete one or more cached motion vectors if input is matched to a cached invalidator associated with the one or more motion vectors.

16. The system of claim 11, wherein the motion vectors are unique and predictable.

17. The system of claim 11, wherein the motion vectors are generated ahead of time or during runtime.

18. The system of claim 11, wherein the motion vectors are stored at the server and sent to the client to be cached on-demand.

19. The system of claim 11, wherein the motion vectors are game-generated.

20. The system of claim 19, wherein the game-generated motion vectors are generated as per-pixel motion vectors and transformed into per-macroblock motion vectors.

21. The system of claim 11, wherein the invalidators are one of or a combination of player inputs and time windows.

* * * * *